US010503770B2

(12) United States Patent
Lee et al.

(10) Patent No.: US 10,503,770 B2
(45) Date of Patent: Dec. 10, 2019

(54) METHODS AND SYSTEMS FOR GENERATING A MEDIA CLIP LIBRARY

(71) Applicant: Rovi Guides, Inc., San Carlos, CA (US)

(72) Inventors: Yuan-Sea Lee, San Francisco, CA (US); Claire Wallters, Saratoga, CA (US); Barbara F. Skliba, Mountain View, CA (US); Lauren Palmateer, San Francisco, CA (US)

(73) Assignee: Rovi Guides, Inc., San Jose, CA (US)

( * ) Notice: Subject to any disclaimer, the term of this patent is extended or adjusted under 35 U.S.C. 154(b) by 233 days.

(21) Appl. No.: 15/391,314

(22) Filed: Dec. 27, 2016

(65) Prior Publication Data

US 2018/0181566 A1   Jun. 28, 2018

(51) Int. Cl.
G06F 17/30 (2006.01)
G06F 16/40 (2019.01)
G06F 21/62 (2013.01)
H04N 21/4147 (2011.01)
H04N 21/45 (2011.01)
G06F 16/435 (2019.01)
G06F 16/583 (2019.01)
H04L 29/08 (2006.01)

(52) U.S. Cl.
CPC ............ *G06F 16/40* (2019.01); *G06F 16/437* (2019.01); *G06F 16/5854* (2019.01); *G06F 21/6227* (2013.01); *H04N 21/4147* (2013.01); *H04N 21/4532* (2013.01); *H04L 67/22* (2013.01); *H04L 67/306* (2013.01)

(58) Field of Classification Search
CPC ........... H04N 21/252; H04N 21/25891; H04N 21/44222
USPC ........................... 707/609, 736, 741; 725/34
See application file for complete search history.

(56) References Cited

U.S. PATENT DOCUMENTS

| | | | |
|---|---|---|---|
| 5,913,013 A | 6/1999 | Abecassis | |
| 6,351,596 B1 | 2/2002 | Ostrover | |
| 7,540,009 B1 | 5/2009 | Bryant et al. | |
| 8,965,177 B2 | 2/2015 | Casagrande | |
| 9,118,868 B2 | 8/2015 | Ellis et al. | |
| 2002/0097983 A1 | 7/2002 | Wallace et al. | |
| 2008/0025694 A1 | 1/2008 | Kang | |
| 2012/0311633 A1 | 12/2012 | Mandrekar et al. | |
| 2013/0138693 A1 | 5/2013 | Sathish et al. | |
| 2014/0052696 A1 | 2/2014 | Soroushian | |
| 2015/0134673 A1* | 5/2015 | Golan ..................... G06F 16/44 707/748 |
| 2015/0254341 A1 | 9/2015 | Rai et al. | |

(Continued)

*Primary Examiner* — Hung T Vy
(74) *Attorney, Agent, or Firm* — Haley Guiliano LLP

(57) ABSTRACT

Methods and systems for automatically generating a media clip library comprising preferred portions of media assets for a user. In one aspect, the system retrieves a profile of the user from memory. Based on the profile, the system identifies a preferred content type for the user. The system identifies a portion of a media asset matching the preferred content type and generates for display the portion of the media asset. The system receives a user input to interrupt the display of the portion of the media asset. Based on receiving the user input, the system retrieves a media clip library associated with user and updates the media clip library to include the portion of the media asset.

22 Claims, 7 Drawing Sheets

(56) References Cited

U.S. PATENT DOCUMENTS

2015/0350707 A1* 12/2015 Reynolds ........... H04N 21/2668
  725/34
2015/0350729 A1* 12/2015 Reynolds ......... H04N 21/25891
  725/34
2017/0201779 A1* 7/2017 Publicover .............. H04W 4/21

* cited by examiner

METHODS AND SYSTEMS FOR GENERATING A MEDIA CLIP LIBRARY

BACKGROUND

Users may wish to identify and record portions of media having their favorite content. For example, a user may be interested in comedy and may wish for a system to record portions of media that contain comedy content. Accordingly, a user may instruct a conventional media system to identify media that include comedy and to store the media into a user's personal media library. However, due to the large number of portions of media that can match a user's defined recording criteria (e.g., comedy), a conventional system may record content although the user may have little interest in viewing each of the recorded clips at a later time (e.g., because the clip was already viewed by the user or because the clip is from a movie in which the user is not interested). Therefore, it would be advantageous to provide systems and methods that automatically generate for a user a media clip library that includes portions of media preferred by the user.

SUMMARY

Systems and methods are described herein to address the shortcomings in conventional systems used for storing media clips. Conventional systems implemented on digital video recorders may store multiple video clips based on parameters set by a user. However, the user may not actually be interested in viewing each of the video clips. The user may wish to store only video clips that are of particular relevance so that he or she is not burdened with searching through multiple undesirable video clips to identify a clip of particular relevance.

The described systems and methods provide for an interactive media guidance application that automatically identifies clips of content that are likely to be of interest to or preferred by a user and stores the identified clips in a media library of the user for viewing at a later time. It is noted that the terms "of interest to" and "preferred by" with respect to the user are used interchangeably throughout this disclosure. In particular, the media guidance application may monitor content that is being consumed by the user. When the media guidance application determines that the user has only partially viewed content in which he or she is interested, the media guidance application may store the content in a media library of the user. For example, the media guidance application may monitor the media viewing habits of a user and determine that the user enjoys media having comedy content. When the media guidance application determines that the user has tuned away from media including comedy content, the media guidance application may store, in a media library of the user, a portion of the media having comedy content. The media guidance application may determine that a first user (e.g., a parent) is interested in a first portion of media (e.g., a portion of media having adult comedy) generated for display by the media guidance application. The parent may tune away from the adult comedy to a second program (e.g., a children's television program) when a second user (e.g., a child) begins viewing the media with the parent. The media guidance application may receive an instruction to tune away from the adult comedy to a child's program in response to the child entering a room where the parent is viewing the adult comedy (e.g., because the adult comedy may be inappropriate for the child and therefore the child should not be exposed to the adult comedy). The media guidance application may store a portion of the adult comedy in a media library of the parent in response to receiving the instruction to change from the adult comedy to the child's program. The media guidance application may receive a request from the parent, at a later time (e.g., when the child is no longer present), to retrieve and generate for display the clip from the media library. The media guidance application may automatically resume playback of the portion when the media guidance application determines that the child is no longer present.

The media guidance application may store content of interest to the user based on a determination that the user will likely desire to view the portion at a later time. The media guidance application may retrieve a profile of the user from a memory, wherein the profile of the user indicates a content type of interest to the user. For example, the media guidance application may retrieve, from a local memory, a profile for the user. The media guidance application may determine, based on the profile, a content type of interest to the user. For example, the media guidance application may identify a setting in the profile of the first user that identifies a content type (e.g., horror movie scenes) requested by the user for recording into the media clip library. The media guidance application may receive a media asset of a plurality of media assets accessible to the user. For example, the media guidance application may receive a programming schedule for a television provider to which the user subscribes. The media guidance application may identify a portion of the media asset matching the content type. For example, the media guidance application may identify a portion of the media asset which matches horror content. The media guidance application may generate for display the portion of the media asset. For example, the media guidance application may generate for display the portion of the media asset on a display device accessible to the media guidance application. The media guidance application may receive a user input interrupting a display of the portion of the media asset before generating for display an entirety of the portion. For example, the media guidance application may receive a user selection of a second media asset of the plurality of media assets accessible to the user before an entirety of the portion of the media asset is generated for display. For example, the media guidance application may receive user input via a user input device comprising a selection of a second media asset. In response to detecting the user selection of the second media asset, the media guidance application may retrieve the media clip library of the first user from the memory and may update the media clip library to include the portion of the media asset, wherein the portion of the media asset is associated with the content type. The portion of the media asset may include a clip from the media asset, a starting time and an ending time of the clip from the media asset and/or another suitable representation of the clip from the media asset. For example, the media guidance application may access a database associated with the media clip library and may update the database to include the portion of the first media asset. The database may be stored locally at a user equipment, at a remote server, or another device suitable for storing the database.

In one aspect, the media guidance application retrieves a profile of a user from memory, wherein the profile indicates a preferred content type for the user. For example, the media guidance application may monitor usage of the media guidance application for a user, such as a parent. The media guidance application may maintain, in local memory, a history of media that was viewed by the parent using the media guidance application. In some embodiments, the media guidance application may retrieve the profile from storage that is remote to the media guidance application. The media guidance application may retrieve the profile of the user from a remote server, such as a server associated with a provider of the media content. The media guidance application may retrieve a profile which comprises preferences that were input directly by the user via a user interface of the media guidance application. The media guidance application may retrieve the profile to identify the content type of interest to the user.

In some embodiments, the media guidance application determines, based on the profile of the user, a preferred content type or a content type of interest to the user. For example, the media guidance application may retrieve a viewing history from the profile of the user. The media guidance application may enumerate various categories of metadata, such as genre information corresponding to each media asset in the viewing history, to identify a most prevalent type of metadata in the viewing history. For example, the media guidance application may analyze the viewing history and, based on the viewing history, may determine that the user most frequently watches comedies. Based on the enumeration, the media guidance application may determine that a content type of interest to the user is comedy. In another example, the media guidance application may retrieve from the profile an explicit preference that was input by the user via a user input interface of the media guidance application. The media guidance application may receive user input (e.g., via a smartphone application configured to communicate with the media guidance application) identifying a preference for content having comedy and may store the preference in the user profile. The media guidance application may identify the content type of interest to the user (e.g., comedy) based on the stored user input in the user profile. In another example, as a result of the analysis of the user profile, the media guidance application may determine that a user prefers a particular series of television shows (e.g., Game of Thrones) because the user has viewed each of the episodes of Game of Thrones.

In this aspect, the media guidance application receives a media asset, wherein the media asset comprises a sequence of frames. Each frame in the sequence of frames may be associated with a respective content type. In some embodiments, the media guidance application may receive a listing of programs that are accessible to the user. For example, the media guidance application may transmit credentials of the user (e.g., NETFLIX login credentials) to a remote server (e.g., a NETFLIX content server) and may receive, from the remote server, a listing of programs that are accessible to the user. The media guidance application may receive a user selection of a media asset of the plurality of media assets that are accessible to the user via the remote server. The media guidance application may receive frames from the remote server and may generate for display frames of the media asset on a display device accessible to the media guidance application.

In some embodiments, the media guidance application retrieves metadata associated with each frame in the sequence of frames. For example, the media guidance application may contact the remote server for metadata associated with a specific frame in the sequence of frames of the first media asset. The media guidance application may transmit a query to the remote server comprising a sequence number for a frame of the plurality of frames in the media asset and may request metadata associated with that frame. The media guidance application may receive, from the remote server, metadata associated with the frame, such as subtitles, a listing of actors/actresses that appear in the frame, a description of content that appears in the frame, etc. The media guidance application may utilize the metadata in determining whether a frame comprises content that is of interest to the user. In another example, the media guidance application may utilize metadata associated with the media asset to infer content associated with the frames. For example, the media guidance application may utilize a television programming schedule to identify a timeslot and channel corresponding to the television show Game of Thrones. The media guidance application may infer that frames received from the channel during the timeslot are associated with Game of Thrones.

In some embodiments, the media guidance application may perform image processing on the frame to identify objects in the frame. The media guidance application may perform an image analysis on a single frame (e.g., a color analysis on the frame) or on a sequence of frames (e.g., a change in colors over a sequence of frames) and, based on the image analysis, may generate data about the contents in the frame. For example, the media guidance application may perform a face recognition algorithm on a frame to compute mathematical representations of faces identified in the frame. The media guidance application may compare the mathematical representations of the faces in the frame to a database listing the mathematical representations for a plurality of actors or actresses to determine whether an actor or actress in the database is present in the frame.

In some embodiments, the media guidance application may generate for display a time bar corresponding to the first media asset. The media guidance application may generate a time bar wherein the time bar graphically depicts a mapping between frames in the sequence to times. For example, a first frame in the sequence may correspond to the beginning of the time bar where a last frame in the sequence may correspond to the end of the time bar. The media guidance application may identify a first range of times that correspond to a portion of the media asset that comprises content that is of interest to the user. For example, the media guidance application may perform the facial recognition as described above to identify frames that comprise Tom Hanks. The media guidance application may identify a first range on the time bar which maps to frames having Tom Hanks. The media guidance application may identify a second range of times that do not map to frames having Tom Hanks. The media guidance application may visually distinguish a first section of the time bar, which corresponds to the first range, with respect to the second section of the time bar, which corresponds to the second range. For example, the media guidance application may highlight on the time bar a portion of the time bar where Tom Hanks appears.

In this aspect, the media guidance application identifies a portion of the media asset, wherein each frame of the portion is associated with the preferred content type. For example, the media guidance application may identify a first frame in the sequence of frames that matches the preferred content type and is an initial frame of a portion of the media asset. In some embodiments, the media guidance application identifies the first frame based on metadata for the first frame being associated with the preferred content type and metadata for a frame immediately prior to the first frame not being associated with the preferred content type. For example, the media guidance application may store frames for the first media asset in a buffer. The media guidance application may identify content in each of the frames using the methods above. For example, the media guidance application may determine that the user likes fast-paced action sequences. The media guidance application may determine that a series of frames comprise fast-paced action sequences when a change in colors between two frames is above a threshold minimum value. The media guidance application may identify the first frame in the sequence based on a determination that a change in colors between a frame immediately preceding the first frame in the sequence is below the threshold minimum value and that a change in colors between the first frame and a frame immediately following the first frame in the sequence is above the threshold minimum value.

In some embodiments, the media guidance application identifies a second frame in the sequence of frames that matches the preferred content type and is a final frame of the portion of the media asset. In some embodiments, the media guidance application identifies the second frame based on metadata for the second frame being associated with the preferred content type and metadata for a frame immediately subsequent to the second frame not being associated with the preferred content type. For example, the media guidance application may determine that a user prefers sports content. The media guidance application may perform an image analysis on each frame of the plurality of frames to identify content within each of the frames. For example, the media guidance application may perform an edge detection algorithm to generate a matrix identifying edges of objects detected within the image. The media guidance application may compare the objects identified in each of the frames (e.g., matrices identifying the edges of objects detected within the fame) with a database listing objects that are associated with sports (e.g., a database listing matrices comprising edges of objects typically associated with sports, such as a soccer ball, football field, etc.). The media guidance application may determine that a frame has sports content when an object from the database of sports objects matches an object identified in the frame. The media guidance application may identify a second frame in the sequence of frames based on a determination that, for example, a frame immediately preceding the second frame in the sequence of frames comprises a sports object and that a frame immediately following the second frame in the sequence of frames does not comprise any sports objects.

In this aspect, the media guidance application generates for display an initial frame of the portion. For example, the media guidance application may generate for display the sequence of frames including the initial frame in the sequence of frames. For example, the media guidance application may buffer frames of the first media asset in a memory accessible to the media guidance application. The media guidance application may retrieve, from the buffer, each frame in sequence order and may generate for display the frame on a display accessible to the media guidance application. For example, the media guidance application may retrieve a frame rate associated with the first media asset (e.g., 24 frames per second) and may retrieve frames from the buffer, in sequence order, such that 24 frames are retrieved and are generated for display during a one-second period.

In some embodiments, the media guidance application may identify, based on a profile of the user, second user equipment associated with the user. For example, the profile of the user may include a plurality of devices which are registered to the user profile. The media guidance application may select a device of a plurality of devices associated with the profile (e.g., a default device in the profile) and may generate for display the sequence of frames including the first frame on the second user equipment. The media guidance application may generate for display the sequence of frames including the first frame on the second user equipment to prevent a second user from viewing the portion when the media guidance application determines that the portion is inappropriate for the second user.

In this aspect, before generating for display a final frame of the portion, the media guidance application receives a user input to interrupt the display of the portion. For example, the media guidance application may receive a user selection of a second media asset of the plurality of media assets, wherein the user selection is received before generating for display the final frame in the sequence of frames. The media guidance application may receive user input via a user input device, such as a remote control. The media guidance application may detect a user input selecting a second media asset, such as a user input requesting the media guidance application to change the display of a first channel associated with the first media asset to a second channel associated with a second media asset. In another example, the media guidance application may detect a user input to interrupt a display of the portion based on a determination that the user has paused, fast-forwarded or rewound a display of the sequence of frames. In another example, the media guidance application may detect a user input to interrupt a display of the portion based on a determination that the user switches from the display of the portion to a menu or application accessible via the media guidance application, such as an interactive program guide.

In this aspect, the media guidance application may receive the user input before the final frame of the portion is generated for display. For example, upon receiving the user input at the media guidance application, the media guidance application may determine whether a second frame, such as the final frame of the portion, has been generated for display by determining whether the second frame is still in a buffer, or by comparing a time associated with the second frame with a current playback time of the first media asset. When the media guidance application determines that the user input arrived before the second frame is generated for display, the media guidance application may store the frames which have not been generated for display so that the user may consume them at a later time. For example, the media guidance application may store, in a memory of the media guidance application, a portion of the frames that have not been generated for display and that precede the second frame in the sequence. The media guidance application may update a media clip library of the user to include a reference to the portion of frames stored in the memory of the media guidance application.

In this aspect, in response to receiving the user input to interrupt the display of the portion, the media guidance application interrupts the display of the portion. For example, the media guidance application may receive an input to interrupt a display of the sequence of frames via a selection of a second media asset. In response to receiving the user selection of the second media asset, the media guidance application may generate for display the second media asset. Generating for display the second media asset may interrupt a display of the portion. For example, the media guidance application may receive decoded frames corresponding to the second media asset from a television tuner accessible to the media guidance application. The media guidance application may generate for display the decoded frames on a display that is accessible to the media guidance application in place of the sequence of frames corresponding to the portion of the first media asset.

In some embodiments, the media guidance application may generate for display the second media asset on first user equipment, such as a display of the media guidance application, and may generate for display the portion of the first media asset on the second user equipment. For example, the media guidance application may generate for display the second media asset, or another image, video, menu, etc. that interrupts the display of the portion, on the first user equipment, such as a television display such that other users may view the second media asset. The media guidance application may generate for display the portion on the second user equipment (e.g., a tablet device registered to the parent) such that the parent can view the portion without fear that a child will see the portion. For example, the media guidance application may automatically generate for display the portion on the second user equipment when the media guidance application determines that the portion would be inappropriate for a second user (e.g., a child).

In this aspect, the media guidance application generates a database entry identifying the portion of the media asset. The portion may comprise less than an entirety of the media asset. For example, the media guidance application may retrieve a media library of the user and may update the media library of the user to include the portion of the media asset that includes content identified by the media guidance application to be of interest to the user. The media guidance application may identify the portion of the first media asset as the frames between the first frame and the second frame in the sequence of frames. The media guidance application may generate a new database entry which includes a pointer to the portion of the first media asset. Alternatively or additionally, the media guidance application may update the database entry to include a title, genre, duration, or other metadata associated with the first media asset or associated with the portion of the first media asset.

In some embodiments, the media guidance application stores an indication of the content type in the database entry. For example, the media guidance application may update the database entry to include a field that lists the content in the portion that the media guidance application determined to be of interest to the user. The media guidance application may determine that a user is interested in sports content. The media guidance application may generate a database entry for a portion of media comprising sports content when the user changes a display of the media while viewing the sports content. The media guidance application may update the database entry to include an indication that the portion of the media includes sports content; that way the user can easily locate clips comprising sports content in his or her media library.

In this aspect, the media guidance application updates a media clip library associated with the user to include the database entry. The media guidance application may retrieve, from the user profile, a database listing a plurality of media clips stored by the media guidance application. The media guidance application may retrieve a media library aggregating content from a plurality of sources. The media guidance application may retrieve database entries corresponding to clips located on a remote server, clips stored locally on a user equipment, or another suitable device. The media guidance application may update the database by adding a row to a media clip library database table including data identifying the portion of the first media asset along with data identifying the content type of the portion. The media guidance application may generate an SQL INSERT statement to insert a new entry into an SQL database table storing the media clip library. The media guidance application may generate the statement to include a pointer to the portion of the first media asset (e.g., a pointer to where the portion is stored locally, or a reference to a beginning and an ending of a remote version of the portion of the first media asset). The media guidance application may also generate the query to include data identifying the content type of the portion (e.g., sports content, Tom Hanks, adult comedy, etc.). The media guidance application may transmit the statement to the SQL database to perform the update on the media clip library.

In some embodiments, the media guidance application may update the media clip library to include the portion after detecting a second user (e.g., a child) who is restricted from accessing the portion of the media asset. For example, the media guidance application may retrieve a second profile of a second user from memory, wherein the second profile of the second user identifies content that is restricted for access by the second user. The media guidance application may transmit credentials of the child to a remote database to gain access to the profile of the child. The media guidance application may determine, based on the profile of the second user, a second content type restricted for access by the second user. For example, the media guidance application may determine that the child is restricted from accessing any content comprising violence (e.g., based on parental control settings retrieved from the second user profile). The media guidance application may determine whether the first content type of interest to the first user matches the second content type restricted from access by the second user. For example, the media guidance application may determine that a content type of interest to the first user is action content. The media guidance application may identify a portion of the first media asset comprising action content. The media guidance application may compare the first content type (e.g., the action content in the portion) to the second content type (e.g., the violent content, which is restricted from access by the second user). The media guidance application may determine to update the media clip library to include the database entry (e.g., the database entry identifying the portion of the first media asset) when the first content type matches the second content type. For example, the media guidance application may determine that the reason that the first user interrupted a display of the media while content of interest to the first user was being generated for display is because the first user felt that the portion was inappropriate for the second user.

In some embodiments, in response to determining that the first content type does not match the second content type, the media guidance application may exclude the database entry from the media clip library. For example, the media guidance application may determine that when the content in the portion is not restricted from access by the second user that the first user changed to the second media asset because he or she was no longer interested in viewing the portion. The media guidance application may exclude the database entry such that the media clip library is not updated to include content that is likely of little interest to the user.

In some embodiments, the media guidance application may determine whether the portion has been previously viewed by the user. For example, the media guidance application may retrieve a profile for the first user comprising a viewing history. The media guidance application may determine, based on the viewing history, whether the user has previously viewed the portion. When the media guidance application determines that the user has previously viewed the portion, the media guidance application may exclude the database entry from the media clip library because, for example, the user likely changed from the first media asset to the second media asset because the user had little interest in viewing the portion again.

In some embodiments, the media guidance application may restrict access to the media clip library by the second user. For example, the media guidance application may determine that the content in the portion is restricted from access by the second user. The media guidance application may restrict access to the media clip library by the second user by hiding clips from the second user determined, by the media guidance application, to contain content that is restricted from access by the second user.

In some embodiments, the media guidance application may determine, based on a first profile for the first user, a location of the first user. For example, the media guidance application may access the profile of the user to identify first user equipment associated with the first user. The media guidance application may query the first user equipment for its location (e.g., a longitude and latitude location based on a GPS signal of the first user equipment). In response to the query, the media guidance application may receive, from the first user equipment, a location of the first user equipment.

In some embodiments, the media guidance application may determine, based on a second profile for the second user, a location of the second user. For example, the media guidance application may identify second user equipment associated with the second user. The media guidance application may transmit a query to the second user equipment requesting a location of the second user equipment. In response to transmitting the query, the media guidance application may receive, from the second user equipment, a location of the second user equipment (e.g., a longitude and latitude location based on a cell tower signal of the second user equipment).

In some embodiments, the media guidance application may compute a distance between the first user equipment and the second user equipment. For example, the media guidance application may compute the absolute value of a subtraction of a first longitude value associated with the first user equipment and a second longitude value associated with the second user equipment. A similar computation may be performed for the latitude values. The media guidance application may compare the computed distance to a threshold maximum distance value. For example, the media guidance application may retrieve from memory a threshold maximum distance where the two users are considered spatially close to each other.

In some embodiments, in response to determining that the distance is less than the threshold maximum distance, the media guidance application may update the media clip library to include the database entry. For example, the media guidance application may determine that, when the users are spatially close, the first user likely selected the second media asset so that the second user could not view the portion of the first media asset. The media guidance application may update the media clip library to include the portion so that the first user can view the portion at a later time when the second user is not present.

In some embodiments, in response to determining that the distance is greater than the threshold maximum distance, the media guidance application may exclude the database entry from the media clip library. For example, the media guidance application may determine that, when the users are spatially distant, the first user likely selected the second media asset due to a lack of interest in viewing the portion of the first media asset. The media guidance application may exclude the database entry from the media clip library because the media guidance application determines that it is unlikely that the user would want to view the portion of the first media asset after having requested the second portion.

In some embodiments, the media guidance application may track a location of the second user and may automatically resume playback of the portion in response to detecting that the second user is greater than a threshold distance away from the first user. For example, in response to receiving the user input to interrupt the display of the portion, the media guidance application may store, in a memory, a position in the sequence of frames corresponding to a frame of the portion corresponding to when the user input was received. The media guidance application may identify a frame from the sequence of frames that is being generated for display, by the media guidance application, when the user input to interrupt the display of the sequence of frames is received by the media guidance application. The media guidance application may identify a position of the frame with respect to the sequence of frames and may store the position in memory. Upon detecting that the user is at a greater than the threshold maximum distance away from the first user, using the methods described above and below, the media guidance application may automatically resume playback of the media asset beginning at the stored position. For example, in response to detecting that the first and the second user are no longer in close proximity, the media guidance application automatically begins playing the media asset. The media guidance application may retrieve the position from memory and may begin playback of the media asset at the position (e.g., the position when the media guidance application detected the user input interrupting the display of the media asset). In another example, the media guidance application may prompt the user as to whether the user would like to resume playback beginning at the position. For example, upon completion of the second media asset, the media guidance application may generate for display a message comprising an option to resume playback of the portion from where the first user left off (e.g., when the media guidance application received the user input to interrupt the display), a beginning of the portion, or after an ending of the portion (e.g., after the second frame).

In some embodiments, the media guidance application may receive a user input to resume playback of the first media asset. For example, the media guidance application may detect user input, such as input via a smartphone application in communication with the media guidance application, switching from the second media asset back to the first media asset.

In some embodiments, in response to determining that the distance is less than the threshold maximum distance, the media guidance application may generate for display the sequence of frames beginning at a frame in the sequence of frames that is located later in the sequence than the final frame of the portion. For example, in response to determining that the first user and the second user are spatially close, the media guidance application may jump to a position in the first media asset that is later than the portion. For example, the media guidance application may skip the portion and jump to a frame immediately following a second frame, such as a final frame of the portion, upon receiving an instruction to resume playback of the first media asset.

In some embodiments, the media guidance application notifies the user that the media clip is updated to include the portion of the first media asset. For example, the media guidance application may generate for display an overlay on top of the first or second media asset notifying the user that the portion of the first media asset has been updated into the clip library for the first user. In another example, the media guidance application may notify the user by identifying user equipment associated with the user and transmitting a message to the user equipment notifying the user that the media clip library is updated to include the portion.

It should be noted that the systems, methods, apparatuses, and/or aspects described above may be applied to, or used in accordance with, other systems, methods, apparatuses, and/or aspects described in this disclosure.

DETAILED DESCRIPTION

Figure 1:
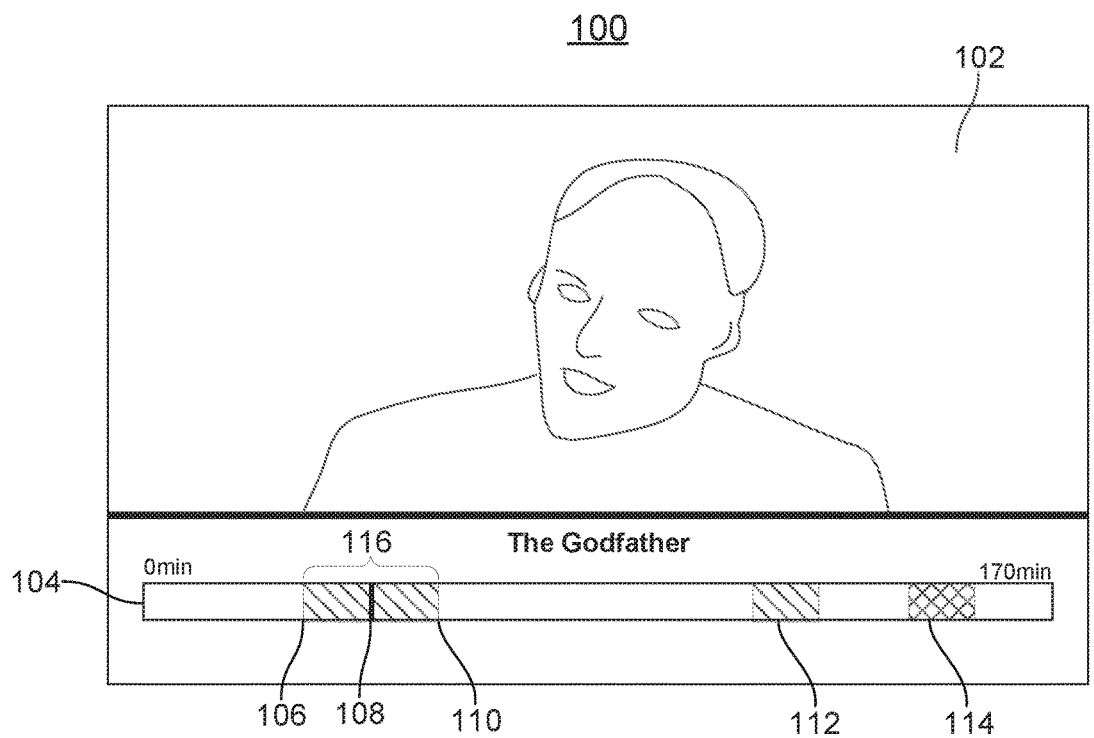
FIG. 1 shows an illustrative embodiment of a display screen including a first media asset having a time bar highlighted to indicate different content in the first media asset, in accordance with some embodiments of the disclosure.

Systems and methods are described herein for providing a media guidance application that generated a media clip library for a user. For example, the media guidance application may determine that a first user, such as a parent, is interested in a first type of content, such as action scenes. The media guidance application may store a clip including a portion of content in which the first user is interested (e.g., an action scene) when the media guidance application receives an instruction to display different media while the portion is being generated for display by the media guidance application. For example, the media guidance application may store an action scene in the media clip library for the first user when the media guidance application receives an instruction to display other media while the action scene is being displayed. In response to detecting the user input to display the second media, the media guidance application may update a media clip database for the user. For example, in response to receiving the user input, the media guidance application may add the portion to the media clip library. The media guidance application may update a database listing for the portion to include metadata about the portion, such as a duration and the type of content (e.g., action scene).

The media guidance application may update the media clip library to include the portion in response to determining that the media clip is inappropriate for a second user (e.g., a child). For example, the media guidance application may retrieve parental control settings for the second user from memory. The media guidance application may store the clip in a media library of the first user in response to determining that the second user is restricted from viewing the portion. The media guidance application may determine that because the second user is restricted from accessing the content, the first user likely tuned to the second media asset to prevent the second user from viewing the portion of the first media asset (e.g., the portion may be an action scene that is inappropriate for the child. The parent may change to a cartoon while the action scene is ongoing, so that the child is not exposed to the action scene). The media guidance application may update the media clip library of the first user to include the portion because the first user may be more likely to view this portion than if the user had simply navigated away from it because he or she was disinterested.

The media guidance application may track a location of the first and the second user and may update the media clip library to include the portion when the second user is in close proximity to the first user. For example, the media guidance application may determine that when the first user is viewing the first media asset with the second user that the command to switch from the first media asset to the second media asset is to prevent the child from viewing the content in the portion. The media guidance application may update the media clip library for the first user so that the first user may view the clip privately when the child is no longer present.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media may include any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), notification information (e.g., text, images, media clips, etc.), on-demand information, blogs, websites, and any other type of guidance data that is helpful for a user to navigate among and locate desired content selections.

In some embodiments, control circuitry 704, discussed further in relation to FIG. 7 below, executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays discussed in relation to FIG. 1, FIG. 2, FIG. 3, FIG. 4, FIG. 5, and FIG. 6. In some implementations, any action performed by control circuitry 704 may be based on instructions received from the media guidance application.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

FIG. 1 shows an illustrative embodiment of a display screen including a first media asset having a time bar highlighted to indicate different content in the first media asset, in accordance with some embodiments of the disclosure. Display screen 100 is depicted having first media asset 102 and an overlay of time bar 104. Time bar 104 is depicted having portion 116 shaded in rightward facing lines beginning at first frame 106 and ending at second frame 110. A progress indicator 108 is depicted within portion 116 indicating that, as depicted, the portion is being displayed. Additionally, time bar 104 is depicted including portion 112 and portion 114 with respectively different shading.

As referred to herein, a "portion" of a media asset may refer to any part of a media asset, such as a live video, that is distinguishable from another part of the media asset. For example, a portion may correspond to a frame, set of frames, scene, chapter, segment of time, etc. The media guidance application may identify distinct portions based on time marks (e.g., a portion begins at a first time mark and ends at a second time mark) in the play length of a media asset. Alternatively or additionally, the media guidance application may identify portions based on a range of frames (a portion begins at a first frame and ends at a second frame). Alternatively or additionally, the media guidance application may identify portions based on content in the media asset (a portion may begin at the appearance of particular content and end at the appearance of the same or different content). Alternatively or additionally, the media guidance application may identify portions based on metadata associated with the media asset (a portion may begin at a first metadata tag and end at a second metadata tag). In some embodiments, the portions of the media asset may correspond to content that is important to the user. For example, the media guidance application may identify content that is important to the user by retrieving a content preference for the user from the user's profile. The media guidance application may compare the content that is important to the user to content tags associated with frames of the media asset. The media guidance application may identify a first frame delimiting a beginning of content that is important to the user based on a determination that the first frame corresponds to a first appearance of the important content in the media asset. The media guidance application may identify a second frame delimiting an ending of content that is important to the user based on a determination that a frame immediately subsequent to the second frame is not associated with the important content. The media guidance application may select, as the portion, frames in the media between the first frame and the second frame.

As referred to herein, a "frame" may be any image associated with media. For example, a frame of a movie may be an image captured at a specific point in a media asset. A media asset may comprise a sequence of frames for playback in a specified order. The media guidance application may perform image processing on a frame of media to determine if there is important content in the media.

In the illustrative example of FIG. 1, the media guidance application may generate for display time bar 104 based on metadata corresponding to first media asset 102. For example, the media guidance application may generate for display time bar 104 having total time 170 minutes in response to determining that first media asset 102 is 170 minutes long. The media guidance application may identify content in the frames corresponding to portions, 112, 114, and 116 and may shade in a section of time bar 104 to visually indicate what type of content is present at the section. For example, the media guidance application may generate rightward diagonal lines to indicate that the section on time bar 104 corresponds to content that contains action scenes. The media guidance application may generate a checkered pattern to indicate the presence of other content, such as a dramatic scene. The media guidance application may generate for display progress indicator 108 to graphically indicate a current playback position in the time bar with respect to the total length of first media asset 102.

Figure 2:
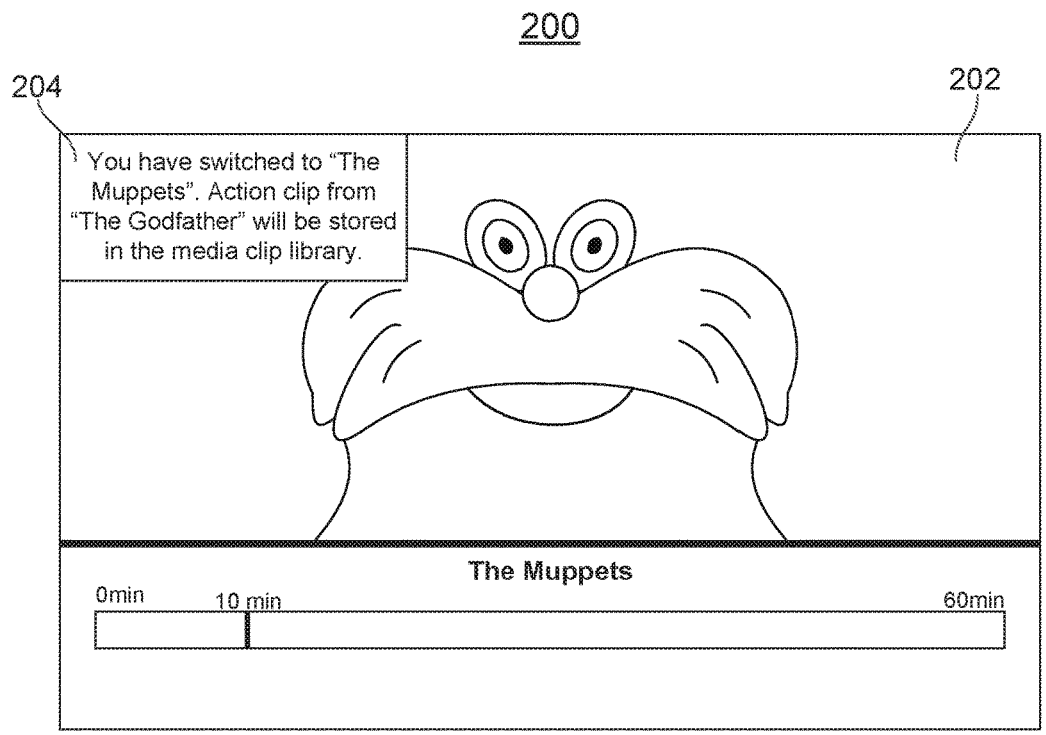
FIG. 2 shows an illustrative embodiment of a display screen including a second media asset and an overlay notifying a user of a media clip library update, in accordance with some embodiments of the disclosure.

FIG. 2 depicts an illustrative example of a display screen including an image interrupting a display of a portion of the media asset and an overlay notifying a user of a media clip library update. Display screen 200 is depicted having second media asset 202 and notification 204.

The media guidance application may receive a user input to interrupt a display of a portion of the media asset. For example, the media guidance application may receive a request to generate for display second media asset 202 in place of first media asset 102. The media guidance application may receive the request to generate for display second media asset 202 while portion 116 is being generated for display. In response to receiving the user input to interrupt the display of the portion, the media guidance application may store a playback position, as depicted by progress indicator 108 so that the media guidance application may resume playback of the portion where it was last viewed. The media guidance application may store portion 116 and progress indicator 108 in a media clip library of the user, and may generate for display notification 204 informing the user that his or her media clip library has been updated. An exemplary process for updating the media clip library of the user is described below in detail in relation to FIG. 9, FIG. 10, and FIG. 11.

In some embodiments, notification 204 may include a prompt allowing a user to resume playback of the portion. For example, the media guidance application may generate for display a selectable element, such as a button or hyperlink, asking the user whether he or she would like to resume playback of the portion. Upon detecting selection of the selectable element, by the media guidance application, the media guidance application may retrieve the playback position and data identifying the portion from the media clip library and may resume playback of the portion beginning at the playback position (e.g., the position that the user last viewed before interrupting the display of the media asset).

Figure 3:
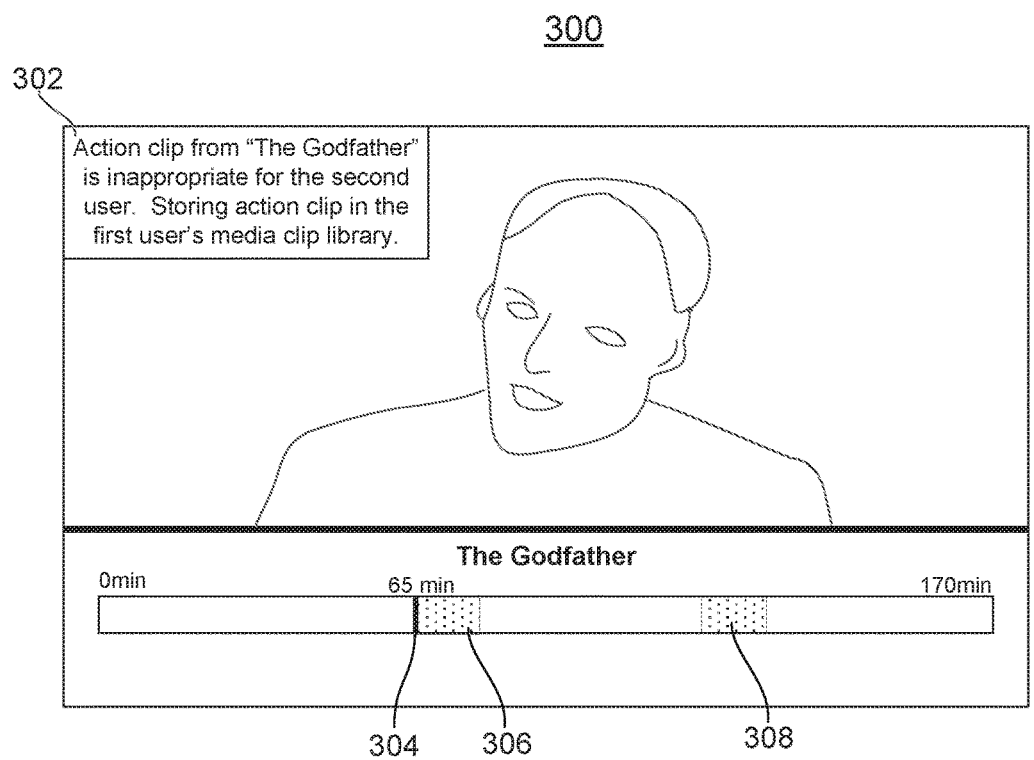
FIG. 3 shows another illustrative embodiment of a display screen that may be used to notify a user of a media clip library update, in accordance with some embodiments of the disclosure.

FIG. 3 depicts an illustrative example of a display screen that notifies the user of a media clip library update. Display screen 300 is depicted having notification 302 and first media asset 102. A time bar (e.g., time bar 104) is depicted having progress indicator 304, portion 306 and portion 308.

The media guidance application may receive an instruction to replace a display of the second media asset with the display of the first media asset. The media guidance application may advance playback of the first media asset to a position represented by progress indicator 304. Based on the instruction to return to the display of the first media asset, the media guidance application may identify portions of the first media asset which are appropriate for the first and the second user and may highlight sections of the time bar (e.g., time bar 104) which correspond to the portions. For example, the media guidance application may determine that only portion 306 is appropriate for both the first user (e.g., a parent) and a second user (e.g., a child) to watch. In response to determining that portion 306 is appropriate for both the first and the second user. The media guidance application may begin playback of the first media asset at portion 306 upon returning to display the first media asset.

Figure 4:
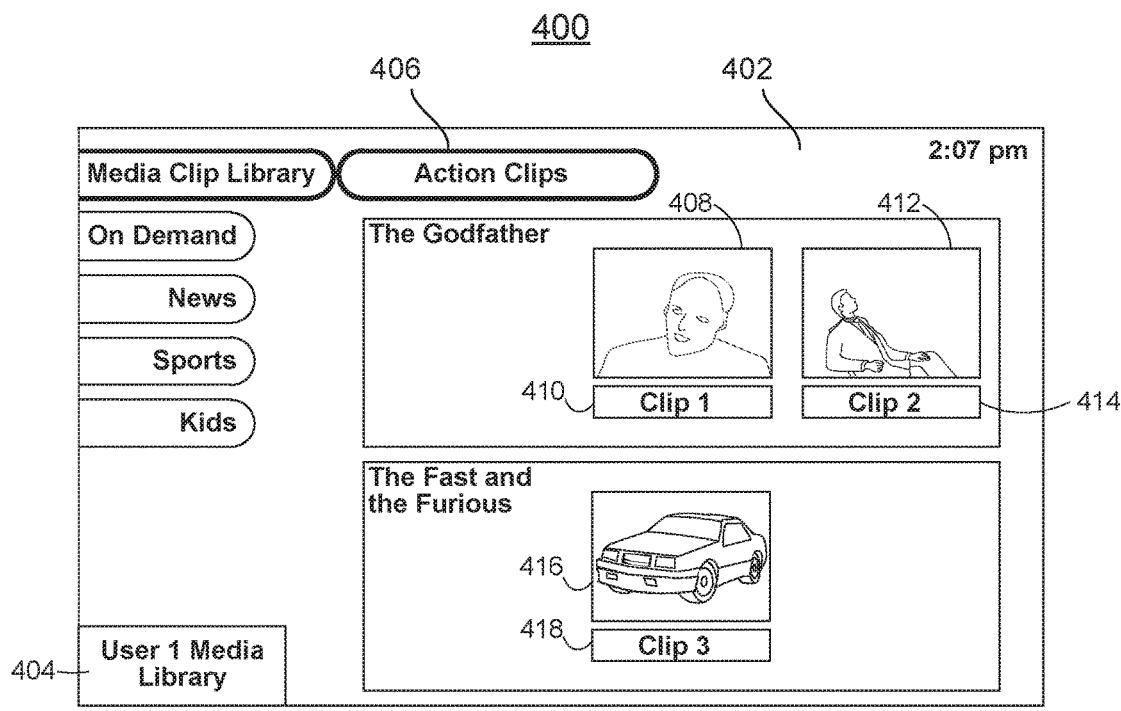
FIG. 4 shows an illustrative embodiment of a display screen that includes an illustrative media clip library, in accordance with some embodiments of the disclosure.

FIG. 4 depicts an illustrative example of a display screen that includes an illustrative media clip library. Display screen 400 is depicted having media clip library 402. Login info 404 denotes that the exemplary media clip library is generated for a first user. The exemplary media clip library is depicted showing action clips as indicated by navigation bar 406. First clip 408 is depicted having first clip description 410. Second clip 412 is depicted having second clip description 414. First clip 408 may correspond to portion 116 and second clip 412 may correspond to portion 112 of first media asset 102. Media clip library 402 is also depicted having third clip 416 with third clip description 418. In the exemplary depiction of FIG. 4, third clip 416 is from a media asset "The Fast and the Furious" which is distinct from the media asset of first clip 408 and second clip 412, "The Godfather". The media guidance application may populate clip descriptions 410, 414, and 418 with metadata about the respective clips. For example, the media guidance application may display a description of what appears in the clip, a duration of the clip, how much progress the first user has made in viewing the clip, etc. For example, the media guidance application may identify the clips and may store the clips in media clip library 402 in response to determining that the user has changed display of the clip while the clip was being rendered for display as discussed further below with respect to FIG. 9, FIG. 10, and FIG. 11.

Figure 5:
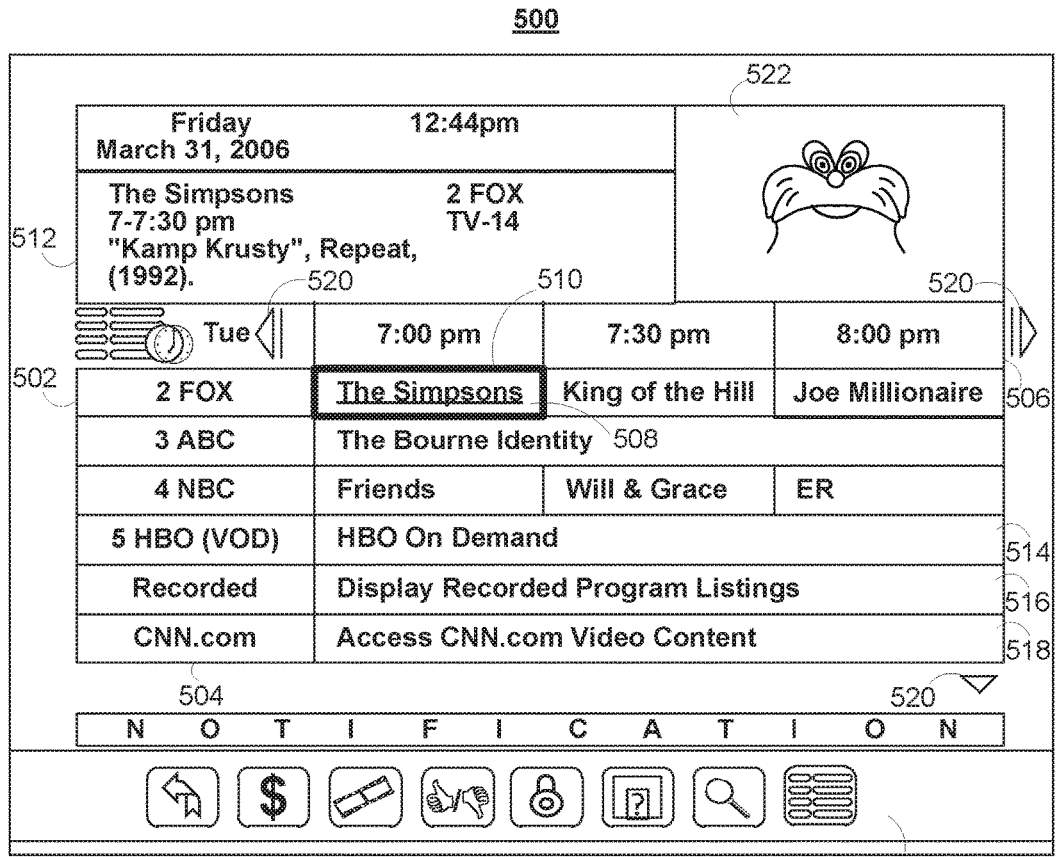
FIG. 5 shows an illustrative example of a media guidance display that may be presented in accordance with some embodiments of the disclosure.
Figure 6:
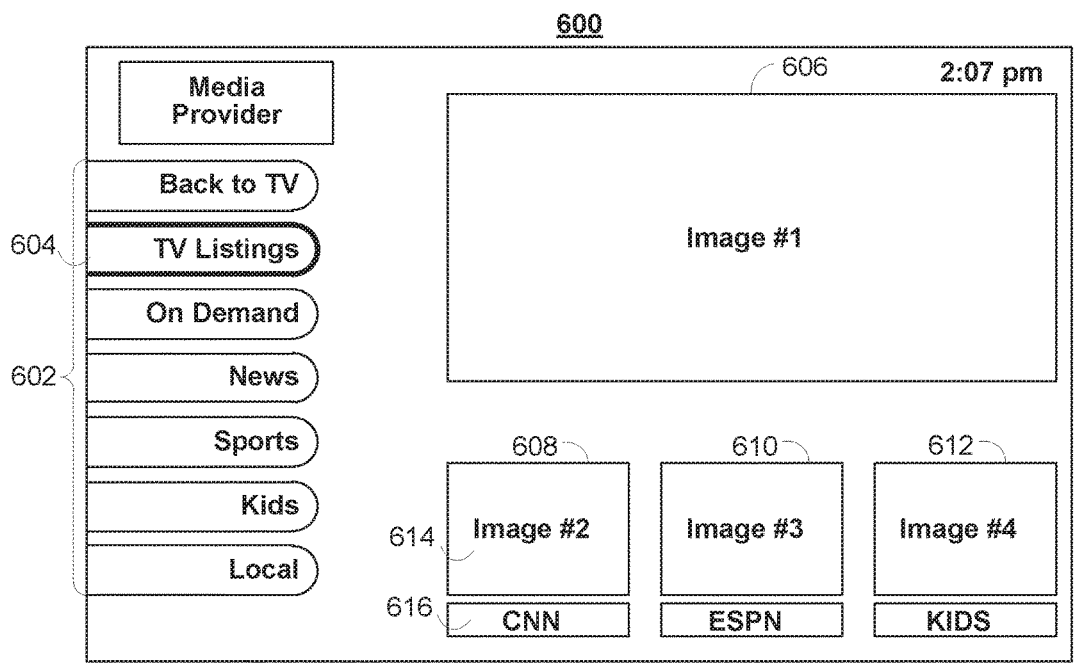
FIG. 6 shows another illustrative example of a media guidance display that may be presented in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
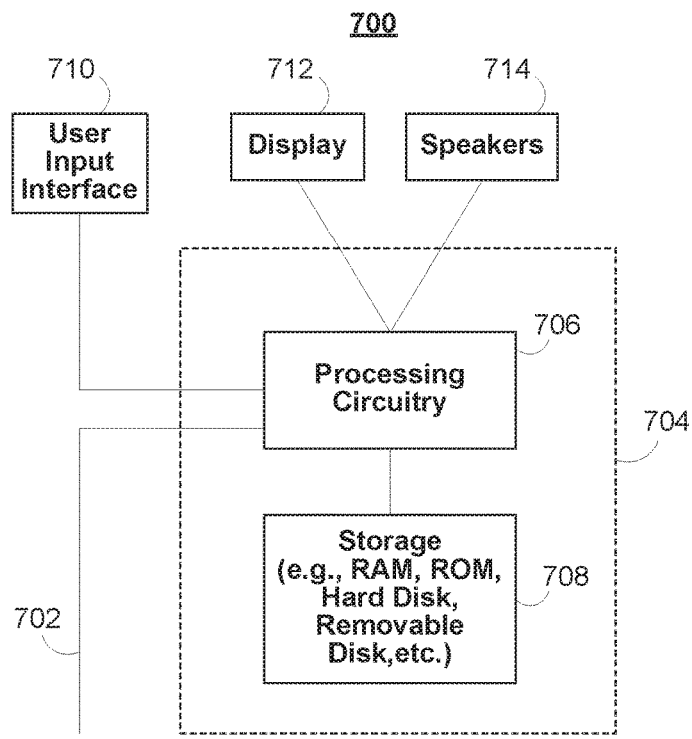
FIG. 7 is a block diagram of an illustrative user equipment device in accordance with some embodiments of the disclosure.
Figure 8:
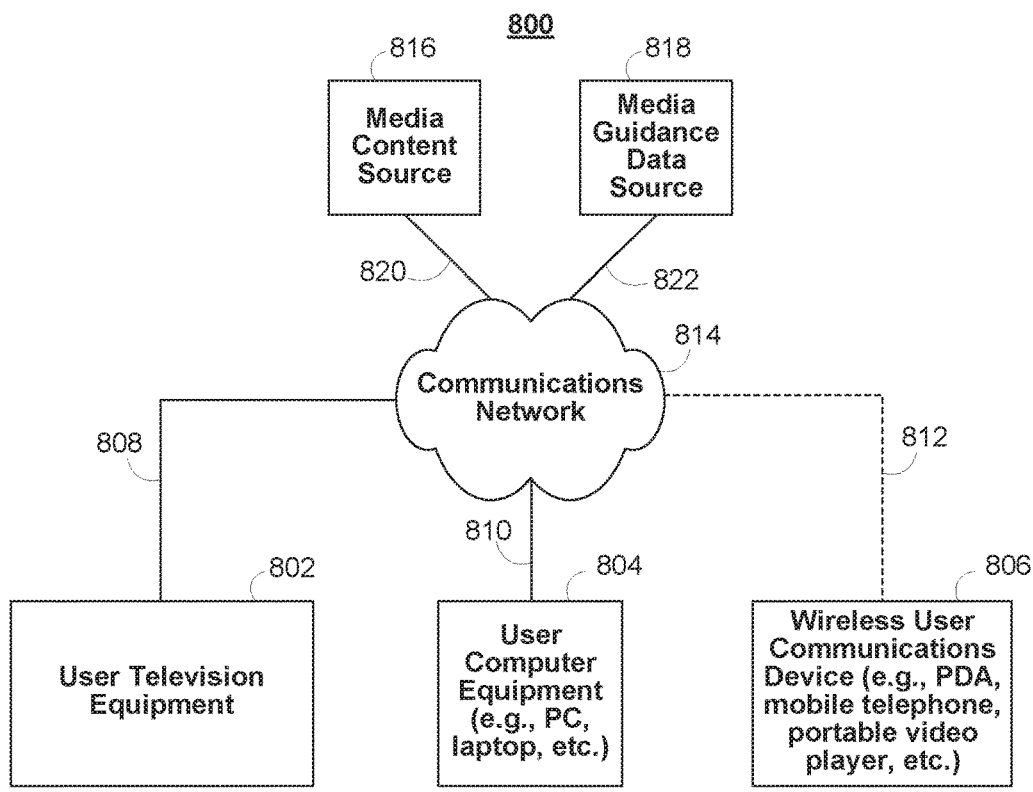
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

System 800 may also include an advertisement source 824 coupled to communications network 814 via a communications path 826. Path 826 may include any of the communication paths described above in connection with paths 808, 810, and 812. Advertisement source 824 may include advertisement logic to determine which advertisements to transmit to specific users and under which circumstances. For example, a cable operator may have the right to insert advertisements during specific time slots on specific channels. Thus, advertisement source 824 may transmit advertisements to users during those time slots. As another example, an advertisement source may target advertisements based on the demographics of users known to view a particular show (e.g., teenagers viewing a reality show). As yet another example, an advertisement source may provide different advertisements depending on the location of the user equipment viewing a media asset (e.g., east coast or west coast).

In some embodiments, advertisement source 824 may be configured to maintain user information including advertisement-suitability scores associated with a user in order to provide targeted advertising. Additionally or alternatively, a server associated with advertisement source 824 may be configured to store raw information that may be used to derive advertisement-suitability scores. In some embodiments, advertisement source 824 may transmit a request to another device for the raw information and calculate the advertisement-suitability scores. Advertisement source 824 may update advertisement-suitability scores for specific users (e.g., first subset, second subset, or third subset of users) and transmit an advertisement of the target product to appropriate users.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, are discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

Figure 9:
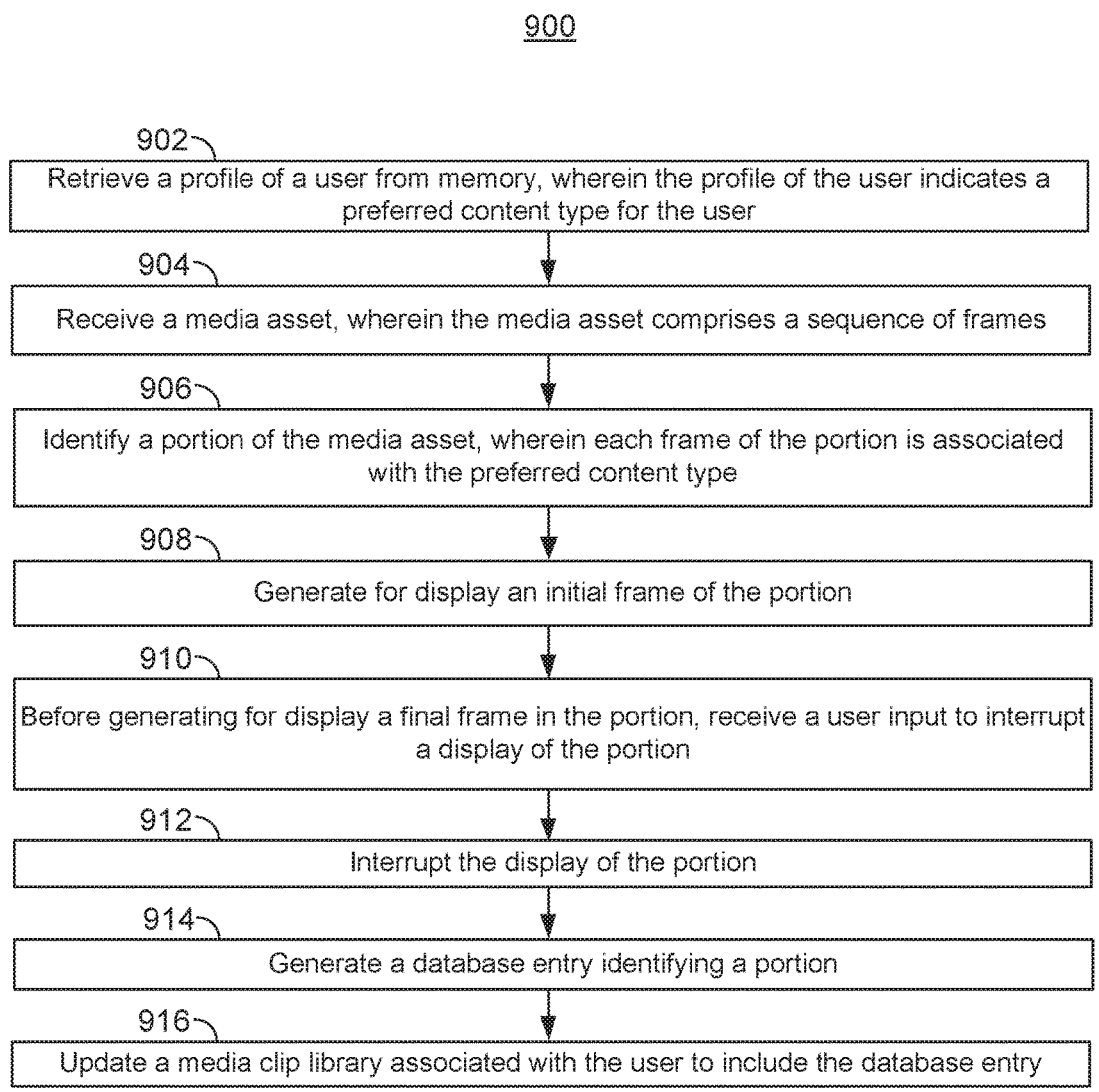
FIG. 9 depicts an illustrative process for generating a media clip library for a user, in accordance with some embodiments of this disclosure.

FIG. 9 is a flowchart of illustrative steps for generating a media clip library for a user. For example, a media guidance application implementing process 900 may be executed by control circuitry 704. In some embodiments, instructions for executing process 900 may be encoded onto a non-transitory storage medium (e.g., storage 708) as a set of instructions to be decoded and executed by processing circuitry (e.g., processing circuitry 706). Processing circuitry may, in turn, provide instructions to other sub-circuits contained within control circuitry 704, such as the tuning, video generating, encoding, decoding, encrypting, decrypting, scaling, analog/digital conversion circuitry, and the like. It should be noted that process 900, or any step thereof, could be performed on, or provided by, any of the devices shown in FIGS. 7-8.

Process 900 begins at step 902, where the media guidance application receives a profile of a user from memory, wherein the profile identifies a preferred content type for the user. For example, the media guidance application (e.g., via control circuitry 704) may determine whether a user profile exists by first identifying the user (e.g., login information, a fingerprint for the user, a picture of the user (e.g., gained through a webcam), a hash value of data uniquely identifying the user or any other known identifying information of the user), and then by comparing the user's identity against entries of a user profile database. As a result of the comparison, control circuitry 704 may receive a pointer to a profile if one is located or may receive a NULL value if the profile does not exist. The user profile database may be located remote or local to control circuitry 704 (e.g., on storage 708 or on media guidance data source 818 accessed via communications network 814).

In some embodiments, control circuitry 704 may identify a first user profile corresponding to the first user. For example, control circuitry 704 may identify a profile for the first user (e.g., a user ID for the profile based on login information stored in storage 708). Control circuitry 704 may utilize the profile of the first user to retrieve a viewing history of programs previously liked or viewed by the user.

In another example, control circuitry 704 may utilize the profile to identify preferences that were explicitly provided by the user. For example, control circuitry 704 may prompt the user to enter his or her media preferences. Control circuitry 704 may store the preferences in the profile for the user and may retrieve the preferences at step 902.

Control circuitry 704 identifies, based on the profile of the user, a content type of interest to the user. For example, control circuitry 704 may use the profile information to analyze a plurality of media that was previously viewed by the user to identify trends or patterns in the viewing habits of the user. For example, control circuitry 704 may retrieve metadata associated with each of the media assets in the viewing history of the user. For example, control circuitry 704 may query media guidance data source 818 for data corresponding to each of the media assets in the viewing history of the user (e.g., by providing a unique identifier for each media asset along with the query). Control circuitry 704 may analyze the metadata to identify how frequently certain types of metadata appear for media previously viewed by the user. For example, control circuitry 704 may analyze media that was previously viewed by the user and may determine that the user frequently views action movies. Accordingly, control circuitry 704 may determine that the user is a fan of action content and may determine that the preferred content type for the user is action content.

In another example, control circuitry 704 may retrieve preferences that were explicitly provided by the user. For example, control circuitry 704 may retrieve preferences from the user profile provided by the user that explicitly identify a content type of interest to the user. For example, control circuitry 704 may provide a setup screen that prompts the user to input his or her content preferences with respect to clips that the user desires for his or her media clip library. Control circuitry 704 may retrieve preferences such as a preference for fighting scenes for a user that enjoys action movies.

At step 904, control circuitry 704 receives a media asset wherein the media asset comprises a sequence of frames. For example, control circuitry 704 may use an API or another interface to access media associated with a media account for the first user. For example, control circuitry 704 may utilize the profile data associated with the first user and may transmit the profile data to a remote server corresponding to a media content provider (e.g., media guidance data source 818 or media content source 816). For example, control circuitry 704 may identify a function in an API corresponding to the media content provider and may utilize the function to retrieve a plurality of media assets for which the first user has access. For example, control circuitry 704 may retrieve a table comprising a listing of media assets that are accessible to the first user. Control circuitry 704 may generate for display the table and may enable the user to select a media asset from a plurality of media assets in the table. The media asset selected by the user may comprise a sequence of a plurality of frames. For example, upon receiving a user selection of the first media asset, control circuitry 704 may utilize a function in the API to begin streaming the first media asset from a remote server, such as media content source 816 to control circuitry 704. Control circuitry 704 may receive, from content source 816, a series of packets forming an ordered sequence of frames that make up the first media asset (e.g., first media asset 102).

In another example, control circuitry 704 may retrieve frames of the media asset (e.g., first media asset 102) from a video tuner accessible to control circuitry 704. For example, control circuitry 704 may instruct a tuner to tune to a channel associated with the media asset (e.g., first media asset 102). Control circuitry 704 may receive from the tuner a plurality of frames decoded from a signal corresponding to the frequency tuned to by the tuner.

In some embodiments, control circuitry 704 retrieves metadata associated with each frame in the sequence of frames. For example, control circuitry 704 may retrieve, from a database, information about each frame of the plurality of frames in the sequence. For example, control circuitry 704 may query media guidance data source 818 for information about each frame of the plurality of frames. Control circuitry 704 may provide, in the query, a frame number and a unique identifier for the first media asset. In response to transmitting the query, control circuitry 704 may receive data about the frame. For example, control circuitry 704 may receive subtitles corresponding to the frame, or may receive a description of actors, actresses, objects, etc. that correspond to the frame.

In some embodiments, control circuitry 704 may run an image-processing algorithm, such as an object detection algorithm on the frame, to identify content in the frame. For example, control circuitry 704 may perform edge detection within a particular frame and, based on the results, detect contours of various objects within the frame. For example, control circuitry 704 may perform a search-based or a zero-crossing-based edge detection method on a frame of the media. Control circuitry 704 may approximate a first derivative of pixel data corresponding to the frame to derive a gradient for the image (e.g., by convolving the image with a kernel, such as a Sobel operator). Based on the gradient, the media guidance application may identify local minima or maxima in the gradient. Control circuitry 704 may suppress all pixels not identified as local minima or maxima and may apply thresholding or hysteresis to filter the output.

When control circuitry 704 completes the edge detection process, control circuitry 704 may extract an object discovered during edge detection. For example, control circuitry 704 may create a fingerprint for objects in the frame based on the edge detection algorithm as described above. Control circuitry 704 may compare the fingerprint for the frame to an object database that stores object fingerprints that are known and have been categorized into known objects. The object database may also store descriptions of the objects contained within the object database. When control circuitry 704 detects a particular object in a frame, control circuitry 704 may retrieve keywords describing the object from the object database. Control circuitry 704 may use the keywords to generate a description of an event occurring in the live video.

In some embodiments, control circuitry 704 may analyze the frame using an image-processing algorithm to track objects within the frame. Based on the movement of the tracked objects and the objects themselves, control circuitry 704 may identify content in the frame. For example, control circuitry 704 may analyze a first frame of the first media asset to identify a first actor in the first frame. Control circuitry 704 may determine whether there is fast action during the frame by tracking a position of the actor across a plurality of frames and determining whether the actor moves by at least a threshold amount. Control circuitry 704 may detect an object in a frame of the set of frames, as described above and may track motion of the object using an accelerated motion vector processing by detecting a position of the object in each frame of the set of frames. If control circuitry 704 determines that the motion of the object is greater than a threshold value, control circuitry 704 may determine that the portion is a fast-paced scene.

In some embodiments, control circuitry 704 may process colors within a frame to infer content of the frame. For example, control circuitry 704 may perform filtering on the colors within the frame and may make determinations about the content of the frame based on the colors. For example, control circuitry 704 may identify an abundance of red within a frame comprising fast action, as described above. Therefore, control circuitry 704 may determine that the scene is a gory action scene. In another example, control circuitry 704 may identify a frame comprising a high value of flesh color. Control circuitry 704 may determine that, due to an increased color of flesh in the frame, the frame may correspond to nudity.

In some embodiments, control circuitry 704 may perform an image processing algorithm to detect characters in a live video. For example, control circuitry 704 may perform an optical character recognition ("OCR") algorithm to detect characters in the live video and may generate a set of string coordinate pairs corresponding to the text in the live video. For example, control circuitry 704 may retrieve a frame of the live video, such as a sports broadcast. Control circuitry 704 may detect text in a ticker at a bottom of the frame of the first media asset (e.g., by performing the object detection procedures as described above and detecting characters). Control circuitry 704 may generate a string matching the string in the news ticker by performing the OCR algorithm on the frame. Control circuitry 704 may associate the string with a position of the original string in the frame (e.g., the bottom of the frame).

At step 906, control circuitry 704 identifies a portion of the media asset, wherein each frame of the portion is associated with the preferred content type. For example, control circuitry 704 may identify as an initial frame in the portion, a first frame in the sequence of frames that matches the content type based on metadata for the first frame being associated with the content type and metadata for a frame immediately prior to the first frame not being associated with the content type. For example, control circuitry 704 may perform any of the frame-processing techniques as described above to determine whether a frame of a plurality of frames matches content that is of interest to the user. For example, control circuitry 704 may determine that the user has a preference for action scenes. Accordingly, control circuitry 704 may perform processing on the frame as described above to identify frames which comprise action. Control circuitry 704 may identify, as the first frame (e.g., first frame 106) in the sequence that does not have action immediately preceding the first frame, but has a frame comprising action immediately following the first frame.

In some embodiments, control circuitry 704 may identify as a final frame in the portion a second frame in the sequence of frames that matches the content type based on metadata for the second frame being associated with the content type and metadata for a frame immediately subsequent to the first frame not being associated with the content type. For example, control circuitry 704 may determine whether each frame in the sequence of frames comprises the content type of interest to the user (e.g., action) as described above. Control circuitry 704 may select, as the second frame, a frame that demarks the end of a portion comprising action by, for example, selecting a frame that is preceded by a frame comprising action but is followed by a frame that does not comprise action.

At step 908, control circuitry 704 generates for display an initial frame of the portion. For example, control circuitry 704 may generate for display the sequence of frames as depicted in FIG. 1. For example, control circuitry 704 may generate for display first media asset 102 and may generate for display a time bar, such as time bar 104 identifying playback progress on the first media asset. Included in the display generated by control circuitry 704 may be the initial frame of the portion identified by control circuitry 704.

In some embodiments, control circuitry 704 may visually distinguish portions of the time bar that correspond to content that is important to the first user with respect to content that is not important to the first user. For example, control circuitry 704 may determine that the portion 116 comprises content that is important to the user (e.g., because control circuitry 704 determines that the user prefers action scenes and because control circuitry 704 determines that the frames comprise action). Control circuitry 704 may identify a portion of the time bar that corresponds to the frames having the important content and may generate for display the portion of the time bar that is associated with the frames that are deemed important from those frames that are not deemed to be important. For example, control circuitry 704 may identify a first section of the time bar, mapping to the frames in the portion (e.g., portion 116), and may shade, color or otherwise visually distinguish the first section of the time bar that a second section of the time bar that does not map to frames in the portion.

In some embodiments, control circuitry 704 may determine that the user has multiple content types of interest to the user. For example, control circuitry 704 may determine that, based on the viewing history of the user, the user prefers sports content and prefers action content. Control circuitry 704 may visually distinguish a first section of time bar 104 corresponding to first important content (e.g., action content) differently from a second section of time bar corresponding to second important content (e.g., sports content). For example, control circuitry 704 may determine that portion 114 corresponds to sports content. Accordingly, control circuitry 704 may visually distinguish the section of time bar 104 corresponding to portion 114 from the section of time bar 104 corresponding to portion 116.

At step 910, before generating for display the second frame in the sequence of frames, control circuitry 704 receives a user input to interrupt a display of the portion. For example, control circuitry 704 may receive an input to interrupt a display of the portion such as a request to pause, skip, fast-forward, stop, and rewind the sequence of frames. Based on the user input, control circuitry 704 may jump to frames in the sequence of frames that do not correspond to the portion (e.g., frames preceding or following the portion). In another example, control circuitry 704 may detect a user input to interrupt a display of the sequence of frames based on determining that the user has powered down, stopped or otherwise modified a display accessible to control circuitry 704. In another example, control circuitry 704 may receive a selection of a second media asset of the plurality of media assets (e.g., may tune away from the first media asset to the second media asset), wherein the user selection is received before generating for display the second frame (e.g., the last frame in the portion) in the sequence of frames. For example, control circuitry 704 may receive a user selection of a second media asset while control circuitry 704 is generating for display a first media asset corresponding to playback position 108. For example, control circuitry 704 may receive an instruction from the user selecting a second media asset from a plurality of media assets to which the user has access. Control circuitry 704 may determine whether the user selection was received during a portion that is of interest to the user by identifying a position of a frame in the sequence that is generated for display when the instruction is received by control circuitry 704. Control circuitry 704 may determine that the user selection was received while the portion of interest to the user is generated for display when the position of the frame is between the position of the first frame and the position of the second frame in the sequence. In some embodiments, control circuitry 704 may store the position in memory (e.g., in the database entry) so that the user may resume playback of the portion at the playback position (e.g., the position where the portion was interrupted).

In some embodiments, control circuitry 704 may determine that, when a user interrupts a display of the portion, the user wishes to store the clip in a media clip library for playback at a later time. For example, control circuitry 704 may determine that, because the user tunes from a first media asset to a second media asset (e.g., interrupts a display of the first media asset) while the portion of the first media asset is displayed, user may have need to change to the second media asset to prevent another user from viewing the portion of the first media asset.

In some embodiments, control circuitry 704 may receive a user selection cancelling a display of the portion of the first media asset. For example, control circuitry 704 may receive a user input turning off a display of the media guidance application (e.g., display 712). Control circuitry 704 may determine that, because the user turned off a display of the media guidance application, the user simply needed to attend to another task and could not finish watching the portion. Accordingly, control circuitry 704 may store the portion in a media clip library for the user so that the user may view the portion at a later time.

At step 912, control circuitry 704 interrupts the display of the portion. For example, control circuitry 704 may interrupt the display of the sequence of frames by generating for display a second media asset of the plurality of media assets. For example, control circuitry 704 may generate for display the second media asset in place of the first media asset. For example, in response to receiving the user selection of the second media asset control circuitry 704 may query media content source 816 for the second media asset. In response to receiving the second media asset (e.g., via communications network 814 from media content source 816), control circuitry 704 may generate for display the second media asset (e.g., on display 712). For example, control circuitry 704 may generate for display second media asset 202, depicted in FIG. 2, in place of first media asset 102, depicted in FIG. 1. In another example, control circuitry 704 may generate for display a menu that overlays the portion. Control circuitry 704 may receive a user to interrupting the display of the portion by way of overlaying a guide display. In response to receiving the user input, control circuitry 704 may generate for display the guide display in place of the portion.

In some embodiments, in response to receiving the user input to interrupt the display of the portion, control circuitry 704 may record the portion of the first media asset to local storage. For example, control circuitry 704 may store portion 116 of first media asset 102 to storage 708. Control circuitry 704 may identify a pointer to the storage location of portion 116 in memory 708 and may store the pointer in a database entry corresponding to the portion for the media clip library. Control circuitry 704 may store, in the database entry, the position of a frame in the portion that was generated for display when the interrupt was received by control circuitry 704. For example, control circuitry 704 may identify frames in a display buffer of control circuitry 704 and determine that the frames that remain in the frame buffer, after receiving the request to interrupt the display of the media asset, have not been generated for display. Control circuitry 704 may select the position of first frame in the buffer so that the user may resume playback of the sequence beginning at a frame that had not been viewed by the user.

In some embodiments, control circuitry 704 retrieves the media clip library of the user from memory. Control circuitry 704 may retrieve, from the user profile, a database storing the plurality of media clips in the media clip library of the user (e.g., media clip library 402). Control circuitry 704 may retrieve a media library aggregating content from a plurality of sources. For example, control circuitry 704 may retrieve database entries corresponding to clips located on a remote server, or may retrieve database entries to clips stored locally to control circuitry 704. Control circuitry 704 may identify clips in the media library corresponding to a plurality of sources, such as first clip 408 corresponding to "The Godfather" and third clip 416 corresponding to "The Fast and the Furious".

At step 914, control circuitry 704 may generate a database entry identifying the portion. The media guidance application may update the database by, for example, adding a row to a media clip library database table, including data identifying the portion (e.g., portion 116) of first media asset 102 along with data identifying the content type of the portion (e.g., data identifying the content as having action). For example, control circuitry 704 may generate an SQL INSERT statement to insert a new entry into an SQL database table storing the media clip library. For example, control circuitry 704 may generate the statement to include a pointer to the portion of first media asset 102 (e.g., a pointer to where the portion is stored locally on storage 708, or a reference to a beginning and an ending of remote version of the portion of the first media asset stored at media content source 816).

In some embodiments, control circuitry 704 stores an indication of the content type in the database entry. For example, control circuitry 704 may identify the content type using any of the methods above for retrieving metadata for the frame. Control circuitry 704 may include in the SQL INSERT statement data identifying the content type of the portion (e.g., action content). Control circuitry 704 may utilize the data identifying the content type to generate for display clip descriptions 410, 414 or 418. Control circuitry 704 may transmit the SQL statement to the SQL database to perform the update on the media clip library.

At step 916, control circuitry 704 updates a media clip library associated with the user to include the database entry. For example, control circuitry 704 may transmit the SQL statement to the SQL database and may wait to receive a confirmation from the database of a successful insert command. For example, control circuitry 704 may wait for a threshold maximum amount of time before retransmitting a query to the SQL database to perform the update. A person of ordinary skill in the art will realize that this is just an exemplary method of updating a media clip library (e.g., media clip library 402). Any type of database, table or storage method could be used to store and update clips in the media library.

In some embodiments, control circuitry 704 may determine whether the portion has been previously viewed by the user (e.g., based on the viewing history of the user stored in the user profile). In response to determining that the user has previously viewed the portion, control circuitry 704 may refrain from updating the media clip library to include the database entry identifying the portion.

In some embodiments, control circuitry 704 may receive an indication that the user wishes to resume playback of the portion. For example, control circuitry 704 may generate for display a notification, such as notification 204 including a prompt to resume playback of the portion. For example, control circuitry 704 may generate for display two buttons, asking the user whether he or she would like to resume playback of the portion. Control circuitry 704 may generate for display a first button to resume playback at the beginning of the portion and a second button to resume playback of the portion from when the user was interrupted. For example, control circuitry 704 may store a position of a frame last viewed by the user as described above. Upon detecting a user selection to resume playback from a previously viewed frame, control circuitry 704 may retrieve the playback position and data identifying the portion from the media clip library and may resume playback of the portion beginning at the playback position (e.g., the position that the user last viewed before interrupting the display of the media asset).

In some embodiments, control circuitry 704 may receive an instruction to resume playback of the first media asset. In response to receiving the instruction, control circuitry 704 may generate for display the sequence of frames beginning at a third frame in the sequence of frames that appears later in the sequence than the final frame of the portion. For example, control circuitry 704 may identify, as the third frame, a frame immediately following a second frame, such as the final frame in the portion, in the sequence of frames of the first media asset. Control circuitry 704 may generate for display the first media asset on a display (e.g., on display 712) beginning at a position of the third frame. For example, control circuitry 704 may resume playback of the first media asset at a progress indicator 304 because the portion is stored in the media library of the user and can be viewed at a later time by the user.

In some embodiments, control circuitry 704 may notify the user that the media clip library includes the database entry identifying the portion of the first media asset. For example, control circuitry 704 may generate for display notification 302 informing the user that the clip is stored in the media clip library for the user.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 7-8 could be used to implement one or more portions of the process.

Figure 10:
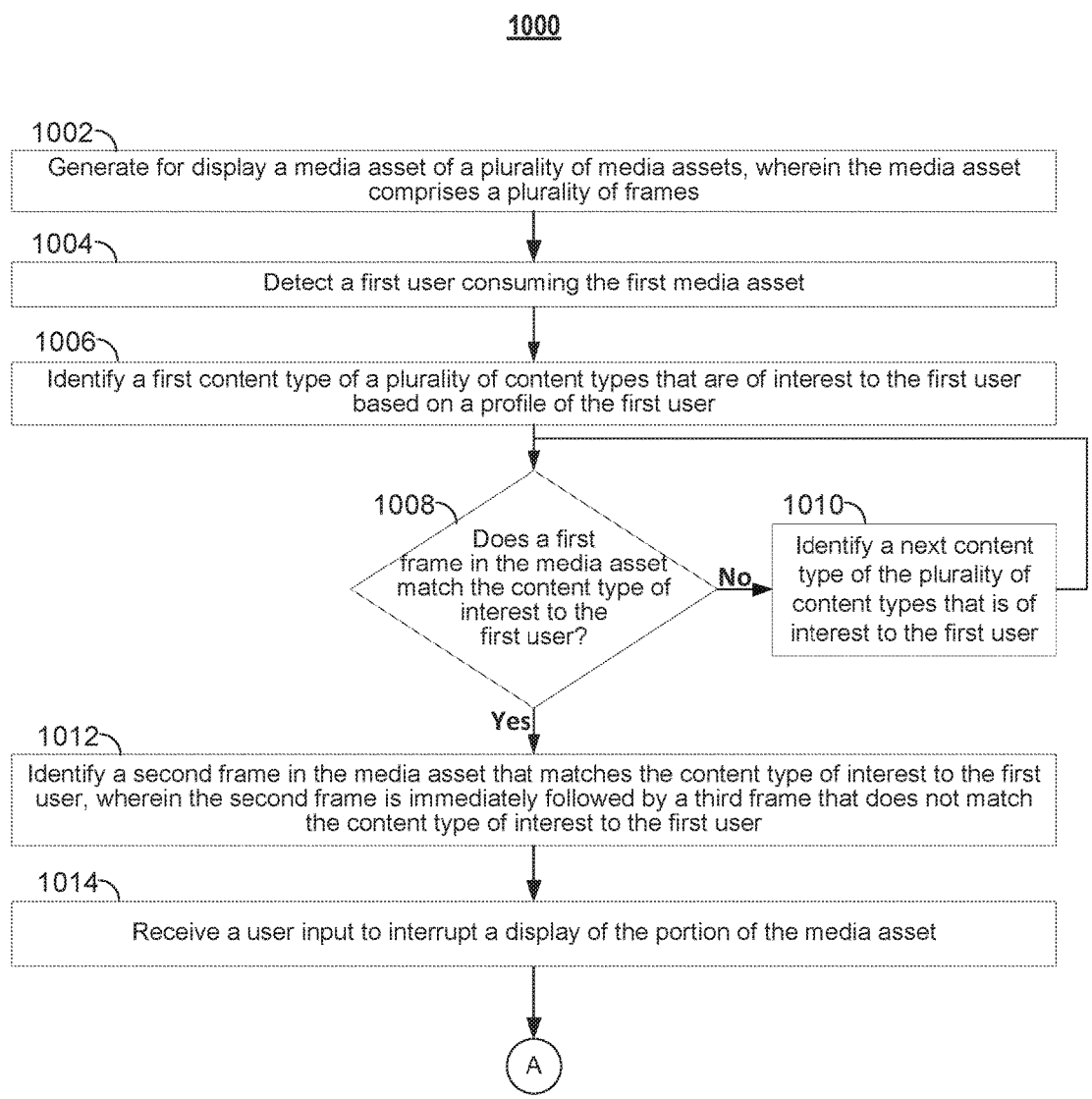
FIGS. 10 and 11 depict illustrative processes involved in determining whether to update a media clip library with a portion of a media asset, in accordance with some embodiments of this disclosure.

FIG. 10 is a flowchart of illustrative steps for determining whether to update a media clip library with a portion of a media asset, in accordance with some embodiments of the disclosure. For example, a media guidance application implementing process 1000 may be executed by control circuitry 704. In some embodiments, instructions for executing process 1000 may be encoded onto a non-transitory storage medium (e.g., storage 708) as a set of instructions to be decoded and executed by processing circuitry (e.g., processing circuitry 706). Processing circuitry may, in turn, provide instructions to other sub-circuits contained within control circuitry 704, such as the tuning, video generating, encoding, decoding, encrypting, decrypting, scaling, analog/digital conversion circuitry, and the like. It should be noted that process 1000, or any step thereof, could be performed on, or provided by, any of the devices shown in FIGS. 7-8.

At step 1002, control circuitry 704 generates for display a media asset of a plurality of media assets wherein the media asset comprises a plurality of frames. As described above in relation to FIG. 9, control circuitry 704 may receive a plurality of media assets accessible to the first user and may generate for display a media asset on a display device, such as display 708.

At step 1004, control circuitry 704 detects a first user consuming the media asset. For example, control circuitry 704 may detect, using a camera associated with the media guidance application, faces of users consuming the first media asset. Control circuitry 704 may identify the first user consuming the first media asset, based on facial recognition of the first user (e.g., based on face information stored in the profile of the first user) compared to image data received via the camera of the media guidance application.

In another example, control circuitry 704 may approximate a location of the user based on first user equipment associated with the user. For example, control circuitry 704 may retrieve from the user profile a listing of user equipment associated with the first user. Control circuitry 704 may select a preferred device from the profile of the user and may compute a distance of the user equipment to the media guidance application. For example, control circuitry 704 may approximate a distance between the first user equipment and the media guidance application, using a first signal strength of a wireless connection (e.g., Bluetooth connection, Wi-Fi connection, etc.) between the first user equipment and the media guidance application. Control circuitry 704 may determine that the first user equipment is within a threshold maximum distance based on the approximation.

In another example, control circuitry 704 may detect the presence of the user based on audio input to the control circuitry 704. For example, control circuitry 704 may retrieve from the user profile a voice fingerprint associated with the user. For example, control circuitry 704 may retrieve a mathematical representation of unique features present in the voice of the user. Control circuitry 704 may process incoming voice input by, for example, performing a Fourier transform on the voice input and comparing the spectral densities for the incoming voice signal to the spectral densities identified in the voice fingerprint. When the spectral densities for the incoming voice signal are within a threshold range of the spectral densities, then control circuitry 704 may determine that the user is close to control circuitry 704 (e.g., because a microphone of control circuitry 704 may detect the audio signals of the user).

At step 1006, control circuitry 704 identifies a first content type based on a plurality of content types that are of interest to the first user. For example, control circuitry 704 may determine that the user is interested in action content based on an analysis of the viewing history of the first user, as described above, or based on explicit settings, defined by the user, that are stored in the user profile.

At step 1008, control circuitry 704 determines whether the first frame in the media asset matches the content type of interest to the user. For example, control circuitry 704 may perform any of the frame-processing methods described above to identify content in the frames. Control circuitry 704 may compare content that is identified in the frame to content that is of interest to the user. If the content matches, control circuitry 704 proceeds to step 1012. If the content does not match, control circuitry 704 receives a next content type of a plurality of content types that are of interest to the user at step 1010 and then proceeds to step 1008 to determine whether content in the frame matches a next content type of interest to the user.

At step 1012, control circuitry 704 identifies a second frame in the media asset that matches the content type of interest to the user, wherein the second frame is immediately followed by a third frame that does not match the content type of interest to the user. For example, control circuitry 704 may select a second frame, as described above, which delimits a portion of the media asset comprising the important content.

At step 1014, control circuitry 704 retrieves a user input to interrupt a display of the portion of the media asset. For example, control circuitry 704 may receive a selection of a second media asset of a plurality of media assets while the portion of the first media asset is generated for display. For example, control circuitry 704 may receive user input (e.g., via user input interface 710) selecting a second media asset of the plurality of media assets while the portion of the first media asset is generated for display on display 712. Control circuitry 704 may generate for display the second media asset in place of the first media asset. At the completion of step 1014, control circuitry 704 proceeds to step 1102 of process 1100.

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations, such as those at 1008, may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 7-8 could be used to implement one or more portions of the process.

Figure 11:
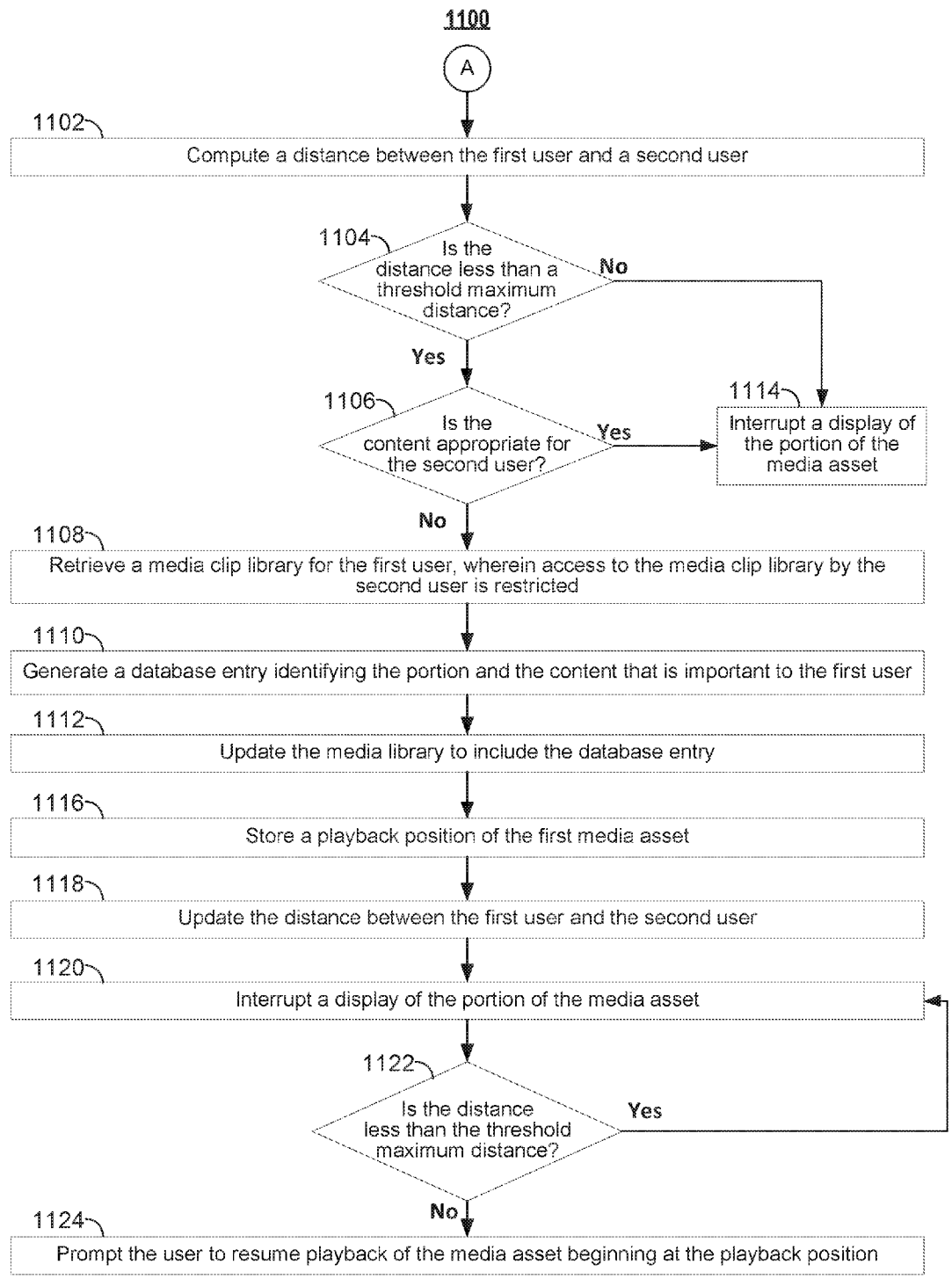

FIG. 11 is a flowchart of illustrative steps for determining whether to update a media clip library with a portion of a media asset, in accordance with some embodiments of the disclosure. For example, a media guidance application implementing process 1100 may be executed by control circuitry 704. In some embodiments, instructions for executing process 1100 may be encoded onto a non-transitory storage medium (e.g., storage 708) as a set of instructions to be decoded and executed by processing circuitry (e.g., processing circuitry 706). Processing circuitry may, in turn, provide instructions to other sub-circuits contained within control circuitry 704, such as the tuning, video generating, encoding, decoding, encrypting, decrypting, scaling, analog/digital conversion circuitry, and the like. It should be noted that process 1100, or any step thereof, could be performed on, or provided by, any of the devices shown in FIGS. 7-8.

At step 1102, control circuitry 704 computes a distance between the first user and the second user. For example, control circuitry 704 may identify second user equipment associated with the second user. For example, control circuitry 704 may retrieve the profile of the second user and may identify a list of devices registered to the second user. Control circuitry 704 may compute a distance between the first user and the second user by analyzing a wireless signal strength between the first user equipment and the second user equipment. In another example, control circuitry 704 may query the first user equipment for longitude and latitude coordinates of the first user equipment (e.g., using GPS circuitry of the first user equipment) and may query the second user equipment for longitude and latitude coordinates of the second user equipment. Control circuitry 704 may compute a distance between the first and the second user equipment based on the received coordinates.

At step 1104, control circuitry 704 determines whether the distance is less than a threshold maximum distance between the first and the second user equipment. For example, control circuitry 704 may retrieve from memory, such as storage 708, a threshold maximum distance between the first and the second user. Control circuitry 704 may determine that the first user selects the second media asset for display, while the important portion is generated for display. Control circuitry 704 may determine that when the second user is less than the threshold maximum distance away from the first user, the first user cancelled display of the portion of the first media asset so that the second user could not view the content. Therefore, control circuitry 704 proceeds to step 1106 to determine if the content is inappropriate for the second user. In the case where the second user is greater than the threshold maximum distance, control circuitry 704 may determine that the first user cancelled display of the portion simply because the first user was no longer interested in the portion. Accordingly, control circuitry 704 proceeds to step 1114 and interrupts a display of the portion of the media asset without updating a media clip library of the first user.

At step 1106, control circuitry 704 determines whether the content is appropriate for the second user. For example, control circuitry 704 may retrieve a profile for the second user from memory, wherein the profile of the second user indicates a content type restricted for access by the second user. For example, control circuitry 704 may determine that the second user has a setting that blocks media spoilers from being viewed by the second user. Control circuitry 704 may determine that, when the first user tunes away from a first media asset after detecting the presence of the second user, a spoiler was present. Control circuitry 704 may store the spoiler in the media library of the first user without spoiling the portion for the second user. For example, control circuitry 704 may analyze a viewing history of the first user and may determine that the first user viewed the first two seasons of Game of Thrones. Control circuitry 704 may analyze the viewing history of the second user and may determine that the second user has viewed the only the first season of Game of Thrones. Control circuitry 704 may determine that any portion of a Game of Thrones episode after the first series is not appropriate for the second user because it may spoil the later seasons of Game of Thrones for the second user. Based on a determination that latter seasons of Game of Thrones are inappropriate for the second user, control circuitry 704 may proceed to step 1114 and proceeds with interrupting a display of the portion of the media asset (e.g., so that the second user is not exposed to the spoiler) and updates the media library of the first user so that the first user may review the portion when the second user is not present.

In another example, control circuitry 704 may determine, based on the user profile, whether the second user has a content restriction for the content. For example, control circuitry 704 may determine that the second user is a five-year-old child who has parental control setting that prevents the child from viewing content rated for mature audiences, such as violence in action films. Control circuitry 704 may determine that the content is inappropriate for the second user when the action contains violence (e.g., a scene with blood as described above). In response to determining that the content is inappropriate for the second user, control circuitry 704 may store the portion in the media clip library for the first user so that the first user may view the portion at a later time. In the case where the second user does not have a restriction on the content in the portion, control circuitry 704 may determine that the user selected the second media asset simply because the first user no longer wanted to view the portion. In response to determining that the first user no longer desired to view the portion, control circuitry 704 proceeds to step 1114 and interrupts the display of the portion of the media asset without updating the media clip library of the first user.

At step 1108, control circuitry 704 retrieves the media clip library for the first user wherein access to the media clip library by the second user has a restriction. For example, control circuitry 704 may access a profile of the first user to identify a database comprising the media clip library for the first user. Control circuitry 704 may impose a restriction on access to the clip by the second user because control circuitry 704 determines that the clip is inappropriate for the second user (e.g., because the second user indicated that he or she does not want to view spoilers, or because a parent of the second user imposed content restrictions on the second user).

At step 1110, control circuitry 704 generates a database entry identifying the portion and the content that is important to the first user. For example, control circuitry 704 may generate a database entry comprising a pointer to the portion and may include data identifying content in the portion that is of interest to the first user. For example, the portion of the first media asset may either be stored in the local memory of control circuitry 704, or control circuitry 704 may simply store pointers to a beginning and an ending of the portion with respect to remote version of the media asset (e.g., may store pointers to a beginning frame and an ending frame in a remote stream).

At step 1112, control circuitry 704 updates the media library to include the database entry. For example, control circuitry 704 may transmit the database entry to the database using an SQL INSERT command. Control circuitry 704 may wait for a response from the database to confirm that the entry was successfully updated in the media library.

At step 1114, control circuitry 704 interrupts a display of the portion of the media asset. For example, control circuitry 704 may generate for display second media asset 202 as depicted in FIG. 2. Control circuitry 704 may request second media asset 202 from a remote media content source such as media content source 816. Control circuitry 704 may generate the frames for display on a display device, such as display 712.

In some embodiments, control circuitry 704 may identify replacement content to generate for display while the media asset is interrupted. For example, control circuitry 704 may access a media library of the second user and may generate for display a clip from the media library of the second user in place of the portion.

At step 1116, control circuitry 704 stores a playback position of the first media asset. For example, control circuitry 704 may identify a position of a frame in the sequence of frames that has been generated for display and is immediately followed by a frame that has not been generated for display by control circuitry 704. Control circuitry 704 may store the position in a database entry corresponding to the portion or may store the position in a memory (e.g., to restart a stream of the media asset beginning at the portion).

At step 1118, control circuitry 704 updates the distance between the first user and the second user. For example, control circuitry 704 may update the distance between the first user and the second user by polling locations of the devices associated with the first and the second user as described above. Control circuitry 704 may receive a response from each of the first and the second devices identifying a respective location. Control circuitry 704 may subtract the locations to compute the distance between the two users.

At step 1120, control circuitry 704 determines whether the distance is less than the threshold maximum distance. For example, control circuitry 704 may compare the distance to a threshold distance value stored in memory to determine whether the computed distance is greater than the threshold. In another example, control circuitry 704 may determine whether the distance is less than the threshold maximum distance by comparing visual or audio input to visual or audio fingerprint for the first and the second user. For example, control circuitry 704 may detect the presence of the first or the second user using a camera or microphone using the procedure outlined above. When control circuitry 704 determines that both the first and the second user are in visual or audible range (e.g., can be detected by a camera or microphone of control circuitry 704), control circuitry 704 may determine that the two users are less than the threshold maximum distance from each other. When control circuitry 704 determines that the first and the second user are not in visual or audible range of control circuitry 704, control circuitry 704 may determine that the users at a distance greater than the threshold minimum distance. When the first user is greater than the threshold maximum distance away from the second user, control circuitry 704 proceeds to step 1124 and prompts the user to resume playback of the media asset. Otherwise, control circuitry 704 proceeds to step 1120 and continues to interrupt the display of the media asset.

At step 1124, control circuitry 704 prompts the user to resume playback of the media asset beginning at the playback position. For example, in response to determining that the second user is no longer present, control circuitry 704 may prompt the user to return to a display of the media asset. Control circuitry 704 may generate for display a notification prompting the user to resume playback of the media asset. In response to receiving user selection of the prompt, control circuitry 704 may resume playback of the portion beginning at the stored playback position. In another example, control circuitry 704 may automatically resume playback of the portion upon detecting that the second user is no longer present. For example, control circuitry 704 may determine that the first and the second user are a threshold distance away from each other using the methods described above. In response to determining that the users are a threshold distance away from each other control circuitry 704 may retrieve the playback position from memory (e.g., the database entry) and may resume playback of the portion beginning at the playback position (e.g., by requesting a restarting of a stream at the playback position or by retrieving a frame corresponding to the playback position from a recording stored in memory).

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations, such as those at 1104 and 1106, may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 7-8 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically generating a media clip library comprising portions of media assets for a user, the method comprising:

retrieving a profile of a first user from a memory, wherein the profile of the first user indicates a content type of interest for the first user;

receiving a media asset, wherein the media asset comprises a sequence of frames;

identifying a portion of the media asset, wherein each frame of the portion is associated with the content type of interest;

generating for display an initial frame of the portion;

before generating for display a final frame of the portion, receiving a user input to interrupt the display of portion; and based on receiving the user input to interrupt the display of the portion:

interrupting the display of the portion;

determining whether the first user and a second user are within a threshold distance;

in response to determining that the first user and the second user are within the threshold distance:

generating a database entry identifying the portion;

updating a media clip library associated with the first user to include the database entry.

2. The method of claim 1, wherein the profile is a first profile, and wherein the content type of interest is a first content type, and wherein updating the media clip library to include the database entry further comprises:

retrieving a second profile for the second user from the memory, wherein the second profile for the second user indicates a second content type restricted for access by the second user;

determining whether the first content type matches the second content type; and based on determining that the first content type matches the second content type, restricting access to the database entry for the second user.

3. The method of claim 2, further comprising excluding the database entry from the media clip library based on determining that the first content type does not match the second content type.

4. The method of claim 1, further comprising:
based on receiving the user input to interrupt the display of the portion, storing, in the memory, a position in the portion corresponding to the user input to interrupt the display of the portion; and
enabling the first user to resume display of the portion beginning at the stored position.

5. The method of claim 1, further comprising:
generating for display a time bar corresponding to the media asset, wherein the time bar graphically depicts a mapping between respective frames in the sequence to respective times;
identifying a first range of times corresponding to frames in the portion of the media asset;
identifying a second range of times that do not correspond to frames in the portion of the media asset; and
visually distinguishing a first section of the time bar with respect to a second section of the time bar, wherein the first section corresponds to the first range, and wherein the second section corresponds to the second range.

6. The method of claim 1, further comprising:
determining, based on the profile, whether the first user has viewed the portion; and
based on determining that the first user has viewed the portion, excluding the database entry from the media clip library.

7. The method of claim 1, further comprising:
buffering each respective frame of the sequence of frames in the memory;
performing image analysis on the respective frame to identify a respective object in the respective frame;
searching a database to identify the respective content type associated with the respective object; and
associating the respective frame with the respective content type.

8. The method of claim 1, wherein the initial frame in the portion is generated for display on first user equipment, and wherein the user profile further indicates second user equipment associated with the user, further comprising:
based on receiving the user input to interrupt the display of the portion, generating for display the portion on the second user equipment.

9. The method of claim 1, further comprising:
receiving a user input to resume playback of the media asset;
generating for display the sequence of frames beginning at a frame in the sequence of frames, wherein the frame is located later in the sequence than the final frame of the portion; and
notifying the first user that the media clip library includes the database entry identifying the portion.

10. The method of claim 1, wherein the profile comprises a viewing history, and wherein retrieving the profile of the first user from the memory comprises:
retrieving metadata associated with each media asset in the viewing history;
identifying a first content type and a second content type, based on the retrieved metadata;
determining, from the profile, that the first user views media assets of the first content type more frequently than media assets of the second content type; and
in response to determining that the first user views media assets of the first content type more frequently than media assets of the second content type, identifying the first content type as the content type of interest.

11. The method of claim 1, further comprising identifying the content type of interest based on content preferences in the profile, wherein the content preferences are received from the first user via a setup screen that prompts the first user to input the content preferences with respect to clips that the first user desires in the media clip library.

12. A system for automatically generating a media clip library comprising portions of media assets for a user, the system comprising:
storage circuitry configured to store a profile of a first user; and
control circuitry configured to:
retrieve the profile of the first user from the storage circuitry, wherein the profile of the first user indicates a content type of interest for the first user;
receive a media asset, wherein the media asset comprises a sequence of frames;
identify a portion of the media asset, wherein each frame of the portion is associated with the content type of interest;
generate for display an initial frame of the portion;
before generating for display a final frame of the portion, receive a user input to interrupt the display of the portion; and
based on receiving the user input to interrupt the display of the portion:
interrupt the display of the portion;
determine whether the first user and a second user are within a threshold distance;
in response to determining that the first user and the second user are within the threshold distance:
generate a database entry identifying the portion;
update a media clip library associated with the first user to include the database entry.

13. The system of claim 12, wherein the profile is a first profile, and wherein the content type of interest is a first content type, and wherein the control circuitry configured to updating the media clip library to include the database entry is further configured to:
retrieve a second profile for the second user from the storage circuitry, wherein the second profile for the second user indicates a second content type restricted for access by the second user;
determine whether the first content type matches the second content type;
based on determining that the first content type matches the second content type, restrict access to the database entry for the second user.

14. The system of claim 13, wherein the control circuitry is further configured to exclude the database entry from the media clip library based on determining that the first content type does not match the second content type.

15. The system of claim 12, wherein the control circuitry is further configured to:
based on receiving the user input to interrupt the display of the portion, store, in the storage circuitry, a position in the portion corresponding to the user input to interrupt the display of the portion; and
enable the first user to resume display of the portion beginning at the stored position.

16. The system of claim 12, wherein the control circuitry is further configured to:
generate for display a time bar corresponding to the media asset, wherein the time bar graphically depicts a mapping between respective frames in the sequence to respective times;
identify a first range of times corresponding to frames in the portion of the media asset;
identify a second range of times that do not correspond to frames in the portion of the media asset; and
visually distinguish a first section of the time bar with respect to a second section of the time bar, wherein the first section corresponds to the first range, and wherein the second section corresponds to the second range.

17. The system of claim 12, wherein the control circuitry is further configured to:
determine, based on the profile, whether the first user has viewed the portion; and
based on determining that the first user has viewed the portion, exclude the database entry from the media clip library.

18. The system of claim 12, wherein the control circuitry is further configured to:
buffer each respective frame of the sequence of frames in the memory;
perform image analysis on the respective frame to identify a respective object in the respective frame;
search a database to identify the respective content type associated with the respective object; and
associating the respective frame with the respective content type.

19. The system of claim 12, wherein the initial frame in the portion is generated for display on first user equipment, and wherein the user profile further indicates second user equipment associated with the user, and wherein the control circuitry is further configured to:
based on receiving the user input to interrupt the display of the portion, generate for display the portion on the second user equipment.

20. The system of claim 12, wherein the control circuitry is further configured to:
receive a user input to resume playback of the media asset;
generate for display the sequence of frames beginning at a frame in the sequence of frames, wherein the frame is located later in the sequence than the final frame of the portion; and
notify the first user that the media clip library includes the database entry identifying the portion.

21. The system of claim 12, wherein the profile comprises a viewing history, and wherein the control circuitry, to retrieve the profile of the first user from the memory, is configured to:
retrieve metadata associated with each media asset in the viewing history;
identify a first content type and a second content type, based on the retrieved metadata;
determine, from the profile, that the first user views media assets of the first content type more frequently than media assets of the second content type; and
in response to the determination that the first user views media assets of the first content type more frequently than media assets of the second content type, identify the first content type as the content type of interest.

22. The system of claim 12, wherein the control circuitry is further configured to identify the content type of interest based on content preferences in the profile, wherein the content preferences are received from the first user via a setup screen that prompts the first user to input the content preferences with respect to clips that the first user desires in the media clip library.

* * * * *